(12) United States Patent
Cohen et al.

(10) Patent No.: US 7,372,400 B2
(45) Date of Patent: May 13, 2008

(54) METHODS AND APPARATUS FOR A NAVIGATION SYSTEM WITH REDUCED SUSCEPTIBILITY TO INTERFERENCE AND JAMMING

(75) Inventors: Clark E. Cohen, Washington, DC (US); Robert W. Brumley, Narberth, PA (US); Mark L. Psiaki, Brooktondale, NY (US); Gregory M. Gutt, Brambleton, VA (US); William J. Bencze, El Granada, CA (US); Brent M. Ledvina, Austin, TX (US); Barton G. Ferrell, Troy, IL (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 11/268,317

(22) Filed: Nov. 7, 2005

(65) Prior Publication Data

US 2008/0062039 A1 Mar. 13, 2008

(51) Int. Cl.
*G01S 1/00* (2006.01)
(52) U.S. Cl. .................... 342/357.01; 342/357.06; 342/357.16; 701/213
(58) Field of Classification Search .......... 342/357.01, 342/357.02, 357.06, 357.16; 701/213, 215; 455/12.1, 13.2
See application file for complete search history.

(56) References Cited

U.S. PATENT DOCUMENTS 5,398,034 A 3/1995 Spilker, Jr.
5,500,648 A * 3/1996 Maine et al. .......... 342/357.05
5,732,387 A * 3/1998 Armbruster et al. ....... 455/13.2
5,812,961 A 9/1998 Enge et al.
5,944,770 A 8/1999 Enge et al.
5,983,160 A 11/1999 Horslund et al.
6,313,789 B1 11/2001 Zhodzishsky et al.

(Continued)

OTHER PUBLICATIONS

Mark L. Psiaki et al, Design and Practical Implementation of Multi-Frequency RF Front Ends Using Direct RF Sampling, ION GPS/GNSS 2003, pp. 1-13.

(Continued)

*Primary Examiner*—Dao Phan
(74) *Attorney, Agent, or Firm*—Ingrassia Fisher & Lorenz, P.C.

(57) ABSTRACT

A navigation system provides a significant level of protection against all forms of interference or jamming to GPS in a cost-effective way. The system employs a network of ground reference stations and Low Earth Orbiting (LEO) satellites in conjunction with GPS. A common-view ranging geometry to a GPS satellite is established that links a reference station and a user. A second common-view geometry to a LEO satellite between the same reference station and user pair is also established. The ground stations synthesize real-time aiding signals by making carrier phase measurements of GPS the LEO satellite signals. This aiding information is transmitted via the LEO satellites to the user receiver at high power to penetrate ambient jamming. The user receiver locks onto the carrier phase of the LEO satellite, demodulates the aiding information, then applies the carrier phase measurements and the aiding information to enable extended coherent measurements of the GPS signals. The system thereby recovers the GPS signals that would otherwise be lost to the jamming.

31 Claims, 9 Drawing Sheets

U.S. PATENT DOCUMENTS

| | | |
|---|---|---|
| 6,373,432 B1 | 4/2002 | Rabinowitz et al. |
| 6,570,534 B2 | 5/2003 | Cohen et al. |
| 6,762,714 B2 | 7/2004 | Cohen et al. |
| 2002/0193108 A1* | 12/2002 | Robinett ..................... 455/427 |
| 2005/0004758 A1 | 1/2005 | Whelan et al. |
| 2005/0114892 A1* | 5/2005 | Chan .......................... 725/63 |
| 2005/0156782 A1 | 7/2005 | Whelan et al. |
| 2005/0159891 A1 | 7/2005 | Cohen et al. |

OTHER PUBLICATIONS

William I. Bertiger et al, A Prototype Real-Time Wide Area Differential GPS System, Navigations, vol. IV, 1999.

I. Y. Bar-Itzhack et al, Control Theoretic Approach to Intertial Navigation Systems, Department of Aeronautical Engineering Technion—Israel Institute of Technology, 1987.

* cited by examiner

AJ RECEIVER CIRCUIT CARD

METHODS AND APPARATUS FOR A NAVIGATION SYSTEM WITH REDUCED SUSCEPTIBILITY TO INTERFERENCE AND JAMMING

TECHNICAL FIELD

The present invention generally relates to navigation systems and, more particularly, to satellite navigation systems operating in environments prone to jamming and interference.

BACKGROUND

In recent years, users of global positioning systems (GPS) have enjoyed real-time three-dimensional navigation capabilities at previously-unavailable performance levels. Except for their susceptibility to interference and jamming, such GPS systems have largely fulfilled the promise of accurate, worldwide satellite navigation. Nevertheless, users continue to demand increasingly high navigation performance, particularly with respect to accuracy and integrity—i.e., the ability of a navigation system to detect false navigation information.

Unfortunately, the presence of jamming and/or interference has prevented full reliance on GPS as means of navigation, especially in certain military or safety-of-life applications. In civil aviation, safety risk due to jamming is generally not an issue. Various contingency procedures have been developed to safely return aircraft to the ground at alternate airfields. However, a dependence on GPS as currently structured could result in a risk of large-scale disruption to air traffic and, therefore, commerce in general. Furthermore, the increasing extent to which GPS is embedded in day-to-day infrastructure, such as ground and marine transportation, and the timing of electrical power distribution, the Internet, cellular telephones, and financial transactions, serves to increase potential societal vulnerabilities due to intentional disruption of the GPS signal from jamming.

Because a GPS signal is relatively weak (a user receives roughly −160 dBW at the terminals of an omnidirectional antenna), it takes very little jamming to bring down navigational capability. A low-cost 5W jammer, for example, is sufficient to disrupt GPS use at a radius of several tens of miles—especially if there is line-of-sight contact with the user. Such sensitivity tends to work against the practicality of satellite navigation and, conversely, in favor of traditional higher-power navigation aids used for aviation, some of which predate GPS, including VOR, DME, ILS, TACAN, and LORAN-C.

Currently, aircraft can only use GPS for supplemental-means navigation. Traditional navigation aids are sufficient for ordinary operations and have power levels that are sufficient to resist jammers who might be tempted to disrupt commerce. Therefore, because of the signal vulnerability of GPS, there is little incentive to take advantage of the significant performance and cost advantages of satellite navigation. The FAA's Wide Area Augmentation System (WAAS) and Local Area Augmentation System (LAAS) offer the potential to bring low-cost aircraft landing capability to thousands of airports nationwide where it was never available before. Today, the United States is paying for two civil safety-of-life navigation systems: the traditional ground-based system, and the newer, more capable satellite-based system.

A number of prior art techniques are available to combat jamming. These methods focus on (i) specialized satellite design and (ii) receiver design. In the satellite, for example, it is always possible to simply increase the raw power broadcast to the ground. However, there is a price for raw power: each Watt of extra power scales up the satellite payload and launch costs accordingly, such that significant increases in broadcast power quickly become expensive. Another approach is to use wider bandwidth broadcasts that can enable additional processing gain. Here, too, there is a price to pay: efficient use of finite spectrum for multiple purposes requires significant global coordination. GPS has specific broadcast spectrum assigned to it, and it is unlikely that any new spectrum will be assigned any time in the foreseeable future.

Receiver approaches to the problem of jamming are generally divided into three categories: (i) antenna pattern shaping, (ii) signal excision, and (iii) averaging. Antenna pattern shaping uses adaptive multi-element arrays of antennas called a Controlled Radiation Pattern Antenna (CRPA) to electronically point a beam directly at a satellite and, therefore, exclude a jammer. A CRPA can also point a null at an estimated jammer direction. CRPAs can be quite effective in most circumstances, although they are generally expensive and bulky. They also have a drawback of becoming less effective when a jammer line-of-sight happens to be nearly coincident with a satellite or, worse yet, when several distributed jammers are used. In this case, the laws of physics place mathematical constraints on the number and quality of beams and nulls that can be applied to a set of jammers for a given CRPA design.

Excision refers to wide-band, pre-correlation signal processing carried out in a GPS receiver. Because the signal characteristics of GPS are well-known, any excess power due to jamming is directly observable by the receiver in real time and can be excised via notch filters, pulse blanking, or any number of other more elaborate techniques. Excision is an effective and inexpensive signal processing step and should generally be carried out as a matter of good practice. However, it is insufficient in and of itself to eliminate all the effects of interference or jamming. For example, if a jammer is broadband noise, the receiver would detect the presence of jamming, but would be unable to apply excision to selectively remove any part of it without a priori knowledge of its character. Current signal processing techniques known as Space Time Adaptive Processing (STAP) and Space Frequency Adaptive Processing (SFAP) combine the CRPA and excision into one processing stage.

Averaging techniques aim to filter out as much jamming as possible during the pre-detection interval (PDI) of the receiver. The most basic form of averaging is the processing gain provided by the ratio of the pre-correlation bandwidth (20.46 MHz) to the pre-detection bandwidth of the receiver (typically 50 Hz). For a P(Y) code receiver, averaging provides a basic level of 56 dB of jamming immunity, and here only for very low dynamics. Attempts to improve upon this level of protection have traditionally encountered several barriers to practical implementation. The first barrier comes from the 50 bps data modulation superimposed on the GPS carrier. This modulation effectively limits the PDI to 20 ms.

Data stripping is one method used to try to get around the 20 ms PDI limitation. Since the GPS broadcast message changes infrequently or in a predictable way, it is often possible to apply pre-recorded frames to remove most of the data modulation. Unfortunately, for military or safety-of-life applications, the method cannot always be counted on because the pre-recorded data message does not always track the actual broadcast message. Consistency between the two data streams can be thrown off by any number of factors, including new ephemeris uploads, operational errors, and system failures. Any inconsistency does not contribute to graceful degradation. A key improvement to the data stripping approach teaches how Low Earth Orbiting (LEO) satellites can provide a global feed forward of the GPS data bits so as to eliminate any gaps in operation. See, e.g., U.S. patent application Ser. No. 10/873,581, entitled "Real Time Data Aiding for Enhanced GPS Performance," filed Jun. 22, 2004.

Unfortunately, regardless of whether data is removed from the GPS carrier, significant obstacles remain in attempting to narrow the pre-detection bandwidth or making use of low signal level measurements. GPS signals are made up of multiple components, including a PRN code modulation and a carrier frequency. In the absence of interference or jamming, receivers typically track both the code and the carrier. In the event of jamming, most military receivers drop out of carrier track and revert to a form of code-only tracking, wherein the raw 20 ms pre-detection samples are multiplied together using variations of a dot-product discriminator. The dot product discriminator is generally considered to be among the most effective of the squaring-type discriminators. These samples are averaged together over an extended interval—sometimes several tens of seconds—to resolve a code tracking error. The commonly-applied benefit of dot-product-type code tracking is that it has somewhat higher jam resistance than carrier tracking alone. The idea is to use an Inertial Navigation System (INS) to subtract out user dynamics, thereby permitting the noisy post-detection samples to be averaged over a long interval. The most integrated version of code-based anti-jam tracking is called "Ultra-Tight Coupling" (UTC).

Unfortunately, ultra-tightly-coupled inertials have only been effective to a certain level of protection. The physics of such systems quickly limits their ability to withstand significant jamming. First, due to squaring losses stemming from the discriminator, long integration times are required. The integration time is proportional to the square of J/S. This means that for every doubling of jamming power, the required integration interval must quadruple. Second, inertial instruments exhibit errors that grow with time. Although some inertial instruments can provide better performance at increased cost, there are practical physical limits as to how long an inertial can remove the platform dynamics without an update from GPS. This limit is usually set by the time the inertial noise takes to reach a large fraction of a code chip—usually about 5 m. For a given quality of inertial, the dependence on GPS code modulation yields a certain jamming level at which the ranging error exceeds a threshold during integration and the system is no longer useful.

Assuming that the GPS data modulation can be removed from the carrier in a dependable way, coherent tracking of the carrier has sometimes been considered but summarily dismissed as an option for increased jam immunity. Such an approach has traditionally been seen as impractical because the receiver must integrate the carrier over a sustained interval to a stability of less than 30 picoseconds (the amount of time it takes light to traverse 1 cm). The challenge is to maintain this required stability over an interval that is much longer than 20 ms. A typical low-cost Temperature Compensated quartz Crystal Oscillator (TCXO) is the basis for the vast majority of GPS receivers today. The part cost generally ranges between $10 and $20. With a TCXO, the pre-detection interval may be safely extended to a large fraction of a second. Beyond this, a TCXO is not sufficiently stable.

Other more stable exotic clocks such as ovenized quartz or atomic clocks based on rubidium or cesium frequency standards are candidates, but even these highly stable clocks have practical issues that do not render them practical. For 30 dB of additional GPS jam protection, a user needs to integrate in the neighborhood 20 seconds. At this level, even many atomic clocks are not capable of providing the needed stability. Vibration, bulk, and cost can become prohibitive. A promising new Chip Scale Atomic Clock (CSOC) approach offers potential to reduce cost, size, weight, and power some years from now, but even the most optimistic projections of performance do not achieve sufficient frequency stability to yield the required phase stability over the needed interval. Some Oven-Controlled Crystal Oscillators (OCXO) possess the required phase stability over the needed interval. However, an OCXO is typically bulky, expensive, and power consuming. A solution depending on such highly stable clocks is not readily accessible without the cost, size, weight, and power consumption associated with precise temperature control. Such a solution with high premium on component performance sensitivity is a significant technical challenge. Power, vibration, and cost become major obstacles. What is needed is a solution that could provide significantly enhanced performance using a standard, low-cost TCXO.

The Military, Civil, and Commercial sectors each have their own issues and work-arounds to jamming. The Military is perhaps best prepared to combat jamming because it is generally less cost constrained and has access to more advanced technology. Unfortunately, even relatively low-power jammers are capable of bringing down user equipment within line of sight of the jammer. In the user equipment, a broad spectrum of anti-jam capabilities are employed, often as a combination of techniques, including CRPAs and ultra-tight inertial coupling. The Military also proposes to implement a new higher-power M-code signal that is intended to boost signal power by approximately 20 dB. Large-aperture spot beam antennas would focus a tighter beam on specific regions of the Earth to concentrate more signal power there. However, even if the cost of deploying such a high-power system were not an object, it will still be many years before such a system will be available for use. What is needed is a low-cost, immediately-available navigation solution.

These military solutions, taken in the aggregate, appear to provide reasonable protection against many jamming threats predicted in the near future. However, these solutions may also fall short under future jamming scenarios—especially as mentioned previously with respect to large numbers of low-power, distributed jammers. Perhaps most important, the set of current solutions described above all tend to be expensive.

Civil vulnerability is a significant challenge. As mentioned previously, GPS already has means to counteract unintentional interference with the addition of the second civil frequency. Because only one frequency is required for many operations, if one frequency is down due to unintentional interference, the other stands a high probability of being operational. For either unintentional or intentional interference, as a last resort, an aircraft can divert to an alternate airport.

The problem of intentional jamming is much worse. Again, the objective is to deny jammers a systematic means of disrupting air travel that would interfere with the daily flow of commerce. The commercial nature of civil aviation requires that any solution to the problem of intentional jamming be cost-effective. Installing expensive user equipment adapted from the Military, such as CRPA antennas, to the civil aircraft fleet has been viewed negatively. So far, the only viable solution has been to maintain the existing navigation aids in service, such as VOR, DME, and ILS, which operate at higher power. Because satellite solutions such as the WAAS do not provide any additional value to aviation users because the existing ground aids are also in operation, there is little incentive for the airlines to transition onto satellite navigation.

Commercial users also have a stake in a non-jammed signal. In addition to the growing dependence on GPS for a variety of commercial functions in society, including timing of the Internet, the power grid, cellular telephone networks, and financial transaction timing, there is also a potential regulatory threat to GPS signal strength that could originate from Ultra-Wide Band (UWB) technology. While UWB has significant promise, there is a distinct possibility of interference if the GPS band is not carefully protected from a regulatory standpoint. Given that regulations can sometimes take time to arrive at a satisfactory balance, it would be desirable to have access to an economical technical "safety net" that would allow users to protect their investment in critical GPS-based infrastructure during this critical transition to coexistence with UWB devices.

In summary, existing systems and methods for providing jam-immunity are unsatisfactory. What is needed is a navigation system that provides high accuracy and integrity for navigation in the presence of interference and/or jamming, thereby ensuring significant and effective anti-jam protection in the near-term for a wide variety of GPS and satellite navigation applications, including military, civil, and commercial.

BRIEF SUMMARY

Systems and methods in accordance with the present invention generally employ a network of ground reference stations and Low Earth Orbiting (LEO) satellites in conjunction with one or more GPS satellites. A first common-view ranging geometry to a GPS satellite is established to link a reference station and a user. A second common-view geometry to a LEO satellite between the same reference station and user is also established. The ground stations synthesize real-time aiding signals by making carrier phase measurements of the GPS and LEO satellite signals. This aiding information is transmitted via the LEO satellites to the user receiver at high power to penetrate ambient jamming. The user receiver locks onto the carrier phase of the LEO satellite, demodulates the aiding information, then applies the carrier phase measurements and the aiding information to enable extended coherent measurements of the GPS signals. The system thereby recovers the GPS signals that would otherwise be lost to the jamming. In this way, the present invention provides significant improvements in jam-immunity at a cost, size, weight, and power comparable to that of an ordinary GPS receiver.

In accordance with one embodiment of the present invention, a navigation system includes: a reference receiver; a user receiver; a global positioning system (GPS) satellite in common view of the reference receiver and the user receiver, wherein said reference receiver and said user receiver receive a carrier ranging signal from the GPS satellite; a first low earth orbit (LEO) satellite in common view of the reference receiver and the user receiver, wherein the reference receiver and the user receiver are configured to calculate respective first and second measurements of a LEO carrier ranging signal from the first LEO satellite; the user receiver configured to receive, via the LEO satellite, the first measurement from the reference receiver and apply the first and second measurements to construct an a priori estimate of a signal phase of the GPS carrier ranging signal received by the user receiver, wherein the a priori estimate is used as the basis of an extended integration of the carrier ranging signal at the user receiver.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, antennas, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, global positioning systems, satellites, network control, and other such functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 1:
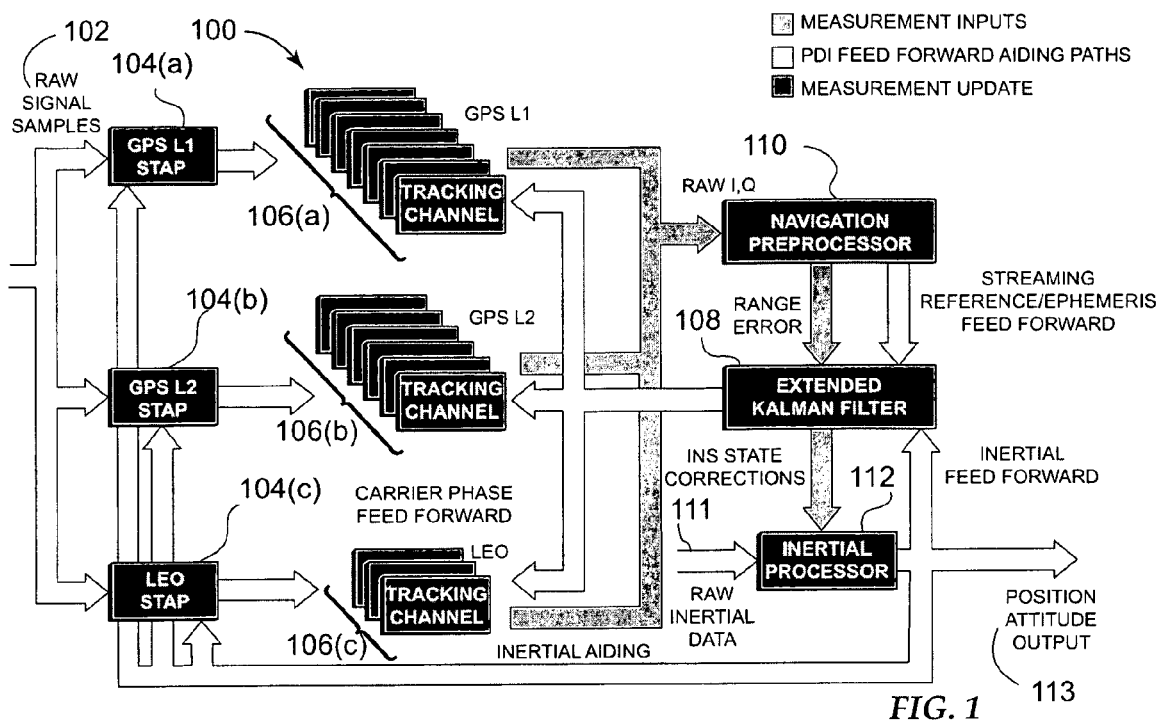
FIG. 1 is a schematic overview of an exemplary user transceiver architecture in accordance with the present invention.
Figure 2:
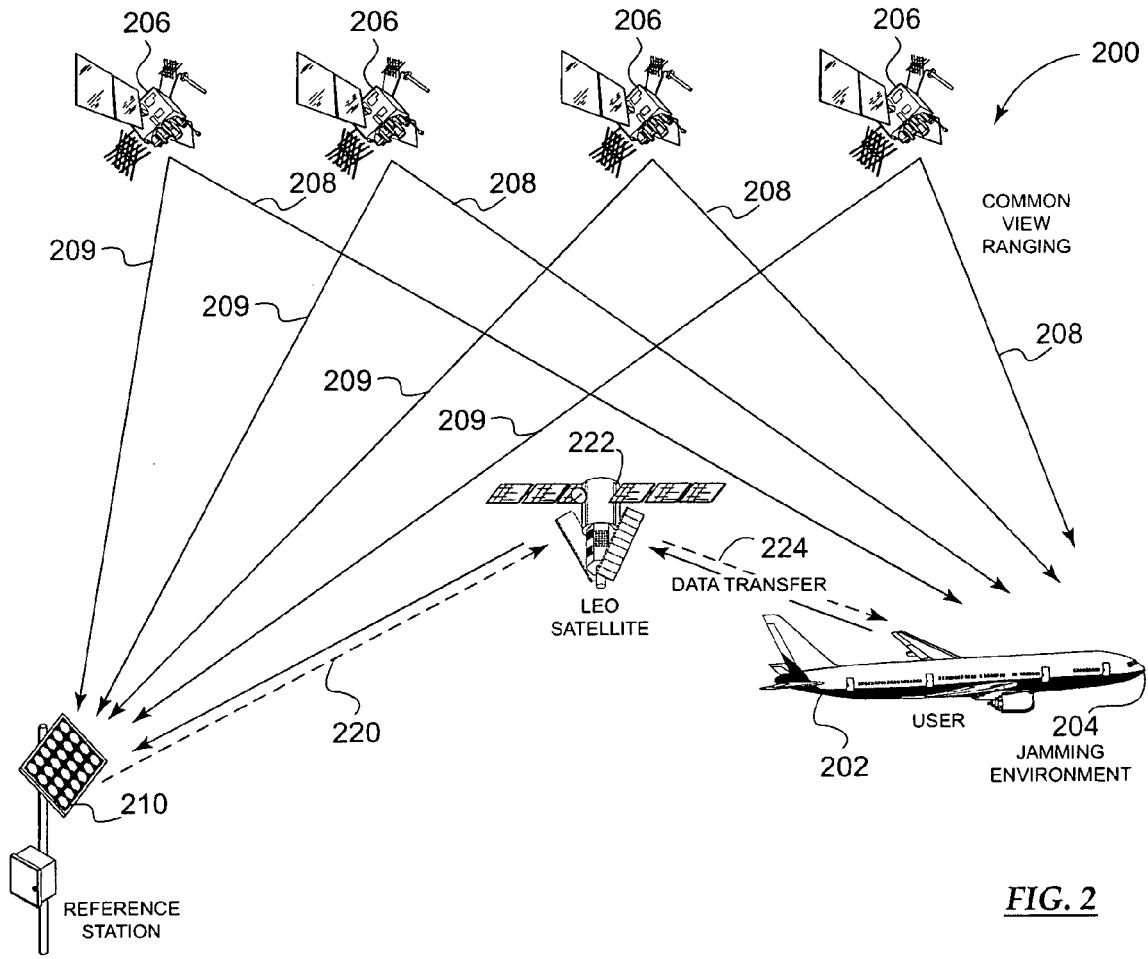
FIG. 2 is a schematic overview depicting the operation of a system in accordance with the present invention.

FIG. 1 presents a general overview of a user receiver component in accordance with one embodiment of the present invention, and FIG. 2 is an overview of a navigation system 200 useful for illustrating operation of the present invention. As shown in FIG. 2, a user 202 attempts to utilize one or more GPS satellites 206 while within an environment 204 subject to jamming and/or interference. In prior art systems, the presence of jamming within environment 204 would limit or even preclude the use of GPS satellites 206. In accordance with the present invention, however, aiding information 220, 224 is conveyed to user 202 via a low earth satellite (LEO) 222 to assist it in recovering GPS signals 208.

One or more reference stations 210 are located and sited outside of the jamming area such that they have a clear line of sight to GPS satellites 206 and are not subject to interference or jamming (including any interference or jamming occurring within environment 204). Aiding information 220 from reference receiver or receivers 210 is uplinked to one or more low-earth-orbit (LEO) satellites 222. The LEO satellite signal 224 is preferably broadcast at sufficiently high power to overcome the jamming power within environment 204 such that it may be received by user 202. Aiding information 220, 224 relayed by LEO satellites 222 is received by a user receiver 100 as shown in FIG. 1, then applied to the GPS signals so as to enable the specially-designed user receiver 100 to recover a useable GPS signal in spite of the jamming or interference.

User receiver 100 of FIG. 1 provides streaming, real-time data flow throughout the tracking channels so as to allow the aiding information to reach the correlators in real-time to a high precision, e.g., centimeter-level precision. This centimeter-level positioning and timing capability enables the receiver to coherently track the GPS signals for extended periods.

Unlike traditional anti-jamming methods, this invention emphasizes the GPS sinusoidal carrier signal component rather than the PRN code. The method is agnostic as to whether the civilian C/A code or military P(Y) or M codes are employed. The codes are used to differentiate among satellite signals and to initialize operation. Other than that, the sinusoidal carrier provides the essential characteristics, yielding both (i) greatly improved anti-jam performance by eliminating squaring loss and (ii) greatly improved accuracy by permitting precision ranging in the midst of jamming.

Figure 3:
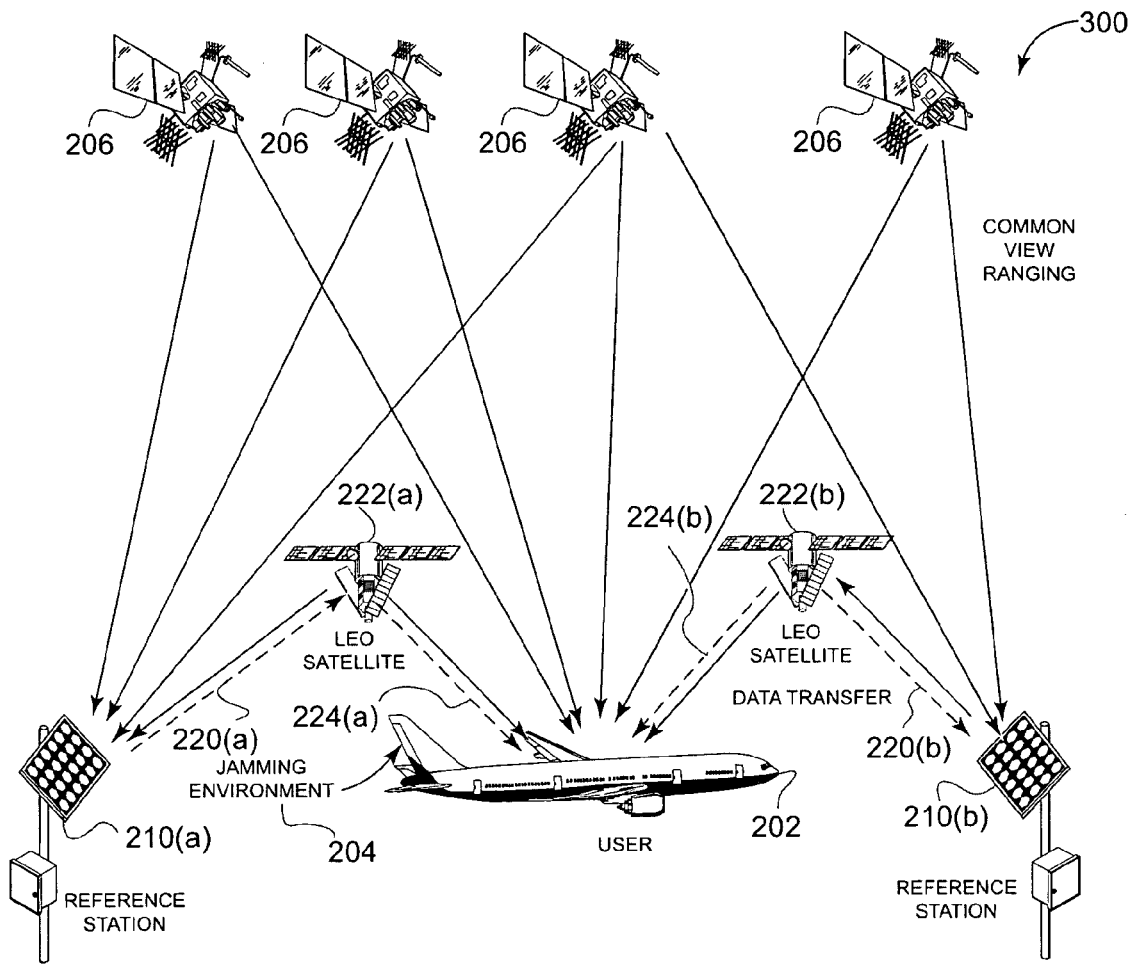
FIG. 3 is a schematic overview of a reference network in accordance with the present invention.

In accordance with a preferred embodiment of the present invention, redundancy is incorporated in the form of at least two reference stations and two LEO satellites such that failures in any portion of the system will not adversely interfere with operations. More particularly, referring to FIG. 3, a dual string version of the invention 300 employs a pair of LEO satellites 222(a) and 222(b), and reference stations 210(a) and 210(b), to ensure that reference information is always available for GPS satellites 206 in view to user 202.

LEO satellites 222 can be any low earth orbiting satellite. In a preferred embodiment, the system includes constellations of LEO satellites 222 so that there is substantially always at least one satellite overhead with respect to user 202. LEO constellations suitable for the present invention include, for example, those offered by Iridium and Globalstar. Both of these LEOs are designed around telephony, and because the average data rate for telephony is about 100 times faster than the nominal 50 bps GPS data rate, the excess can be converted into extra broadcast power. In other words, if the bit rate of a LEO satellite 222 is made comparable to that of GPS, the LEO broadcast will be 20 dB more powerful than a GPS broadcast. If multiple downlinks are switched on corresponding to multiple phone calls, the power can be increased even more. For example, if the equivalent of 10 phone calls are dedicated to a downlink, then the aiding signal 224 will be approximately 30 dB more powerful than GPS. The result is an aiding signal that will provide 30 dB more jamming immunity.

GPS broadcasts in two bands: L1 at 1,575.42±12 MHz, and L2 at 1,227.604±12 MHz. Iridium broadcasts in the band 1,616.0 to 1,626.5 MHz, while Globalstar broadcasts in the band from 2,483.5 to 2,500.0 MHz. A receiver capable of receiving both GPS and a LEO satellite provides a high-performance precise positioning, timing, and communication system known as iGPS. The iGPS anti-jam system can work with either GPS frequency or both.

Figure 4:
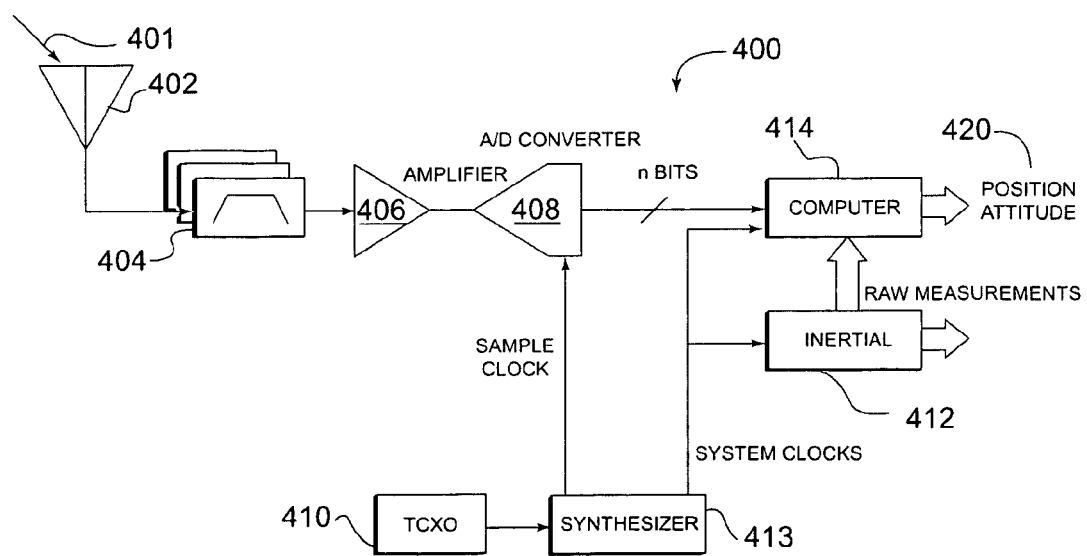
FIG. 4 is a functional block diagram of a receiver in accordance with one embodiment of the present invention.

In a preferred embodiment, a similar anti-jam iGPS receiver is used at both reference stations 210 and user site 202. An exemplary receiver 400, based on a software receiver architecture, is shown in FIG. 4. Owing to increased computing power per chip, per unit cost, and new semiconductor technologies such as high-speed, low-power SiGe RF designs, software receivers are becoming easier to build. The result is lower cost, faster development times, lower size, weight, and power, and, most of all, an extraordinary flexibility with which to integrate components together and into larger systems. It should be recognized that, in some specialized adaptations of the invention, software receiver technology may not suffice and that a design optimized around some other criteria may be required.

With continued reference to FIG. 4, a receiver 400 includes a multi-frequency antenna 402 used to receive satellite signals 401. Antenna 402 is coupled to one or more pre-select filters 404, an amplifier 406, and an A/D converter 408. Synthesizer 413 receives a signal from temperature-controlled crystal oscillator (TCXO) 410, and is coupled to computer 414, Inertial 412, and A/D converter 408 as shown. Computer 414 receives raw measurements from inertial 412 as well as input from synthesizer 413 and A/D converter 408 to produce an output of position, altitude, and time (420). The sampling rate of A/D converter 408 is preferably chosen using the method described the following publication: Mark L. Psiaki, Steven P. Powell, Hee Jung, and Paul M. Kintner, Jr., "Design and Practical Implementation of Multi-Frequency RF Front Ends Using Direct RF Sampling," ION-GNSS, Long Beach, September 2004. In this way, the system downconverts to baseband all bands of interest.

Correct choice of sampling rate ensures acceptable spectral separation spanning the Nyquist range of zero to half the sampling frequency. In the preferred embodiment, such as that employed in Civil Aviation, antenna 402 is a fixed radiation pattern antenna (FRPA), thereby avoiding the cost, bulk, and complexity of a controlled radiation pattern antenna (CRPA). For military applications—especially for use on military platforms—it is more desirable that antenna 402 be a CRPA.

Figure 5:
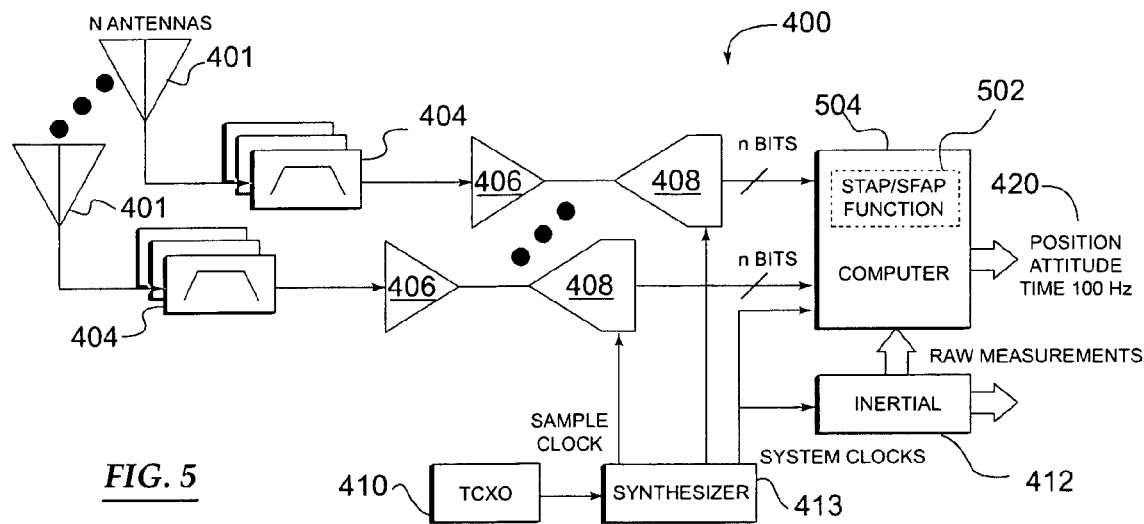
FIG. 5 is a functional block diagram of a receiver and controlled radiation pattern antenna (CRPA)

There are two ways to implement a CRPA. The first is an integrated approach as shown in FIG. 5. Generally, the number of antenna ports 401 on the front end of receiver 400 is expanded to the desired number of CRPA antenna elements. A plurality of respective A/D converters 408, inverters 406, and filters 404 are coupled to antennas 401. STAP/SFAP processing 502 is then carried out in software internal to computer (or DSP) 504, as shown in the figure.

Figure 6:
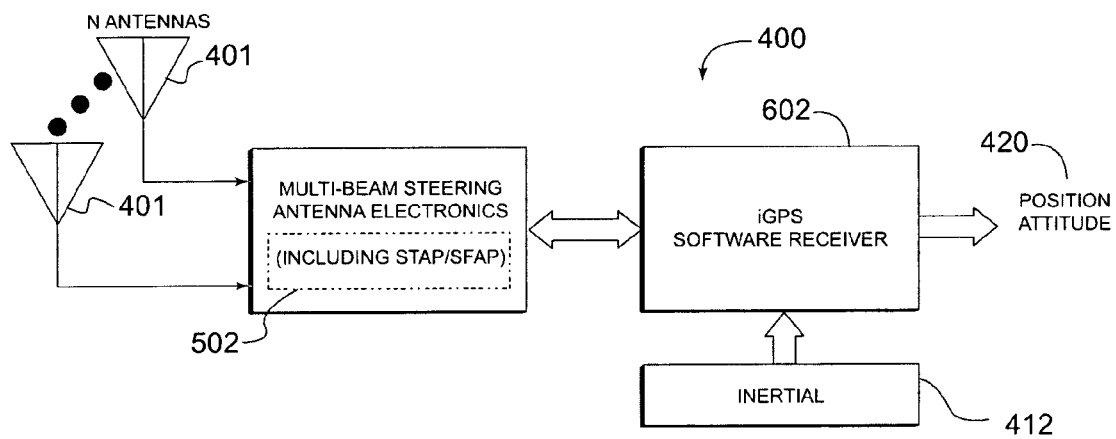
FIG. 6 is a functional block diagram of a receiver and multi-beam steering antenna electronics package in accordance with the present invention.

The second approach is to include a Multi-Beam Steering Antenna Electronics (MBS AE) package in line between the antenna array and the iGPS receiver. Such an embodiment is shown in FIG. 6. This package is modified slightly to repeat the STAP/SFAP processing 502 with the LEO signals as well as the GPS signals. In this regard, the Iridium band lies very close to the GPS L1 band.

Inside the anti-jam iGPS software receiver, the processing begins with a preselection filter 404 for each of the GPS bands (L1 and/or L2) and the LEO signal (such as Iridium or Globalstar). Because software receiver 400 can be engineered to employ direct downconversion, it is desirable for these filters have a sharp cutoff. An example of the electrical components required is the specialized IBM RF chip IBM43GAENGP0001. This receiver contains an integrated SiGe chip which carries out the bandpass, automatic gain control (AGC), and direct RF sampling functions.

In a preferred embodiment, the receiver design ensures that measurements from the different bands are made at the same epoch with respect to the same time base. Once the signals are converted to digital, the architecture cannot introduce inter-channel bias across frequencies and between satellites. This attribute of stable inter-channel biases is very helpful in making high quality coherent measurements and is important to anti-jam performance. If the design trade space for a particular application precludes the use of direct downconversion, then other approaches using conventional downconversion will be apparent, as long as careful consideration is applied to achieving stable biases.

With reference to FIG. 4, the number of A/D converter bits within A/D 408 is a matter of design choice. To accommodate non-Gaussian jamming and to allow for preprocessing by the STAP/SFAP functions, more bits may be necessary.

In accordance with one aspect of the present invention, a simple, low-cost TCXO frequency reference 410 may be employed. An exotic clock such as an atomic oscillator or an ovenized crystal oscillator (OCXO) is not necessary. Such a TCXO is typically quite rugged, able to sustain significant vibration and thermal variation, and yet relatively inexpensive (i.e., on the order of $10 or $20). The central attributes of this invention will render the overall system and method largely insensitive to imperfections in the receiver clock.

If the receiver is to be used for high dynamic applications, it preferably employs some sort of inertial reference 412. Any type of inertial device 412 is compatible with this invention, ranging from high-performance navigation grade inertial devices to tactical grade inertial systems. In the preferred embodiment, a chip scale inertial device is used. Current chip scale inertials include Micro-Electromechanical Systems (MEMS) devices, which typically provide the lowest cost, size, weight, and power profiles. An example of a MEMS INS is the Honeywell HG-1930. An example of a chip scale MEMS gyro is the Systron Donner MEMS Gyro LCG50. An example of a MEMS accelerometer is the Kionix 3-Axis MEMS Accelerometer KXM52-1050.

Figure 7:
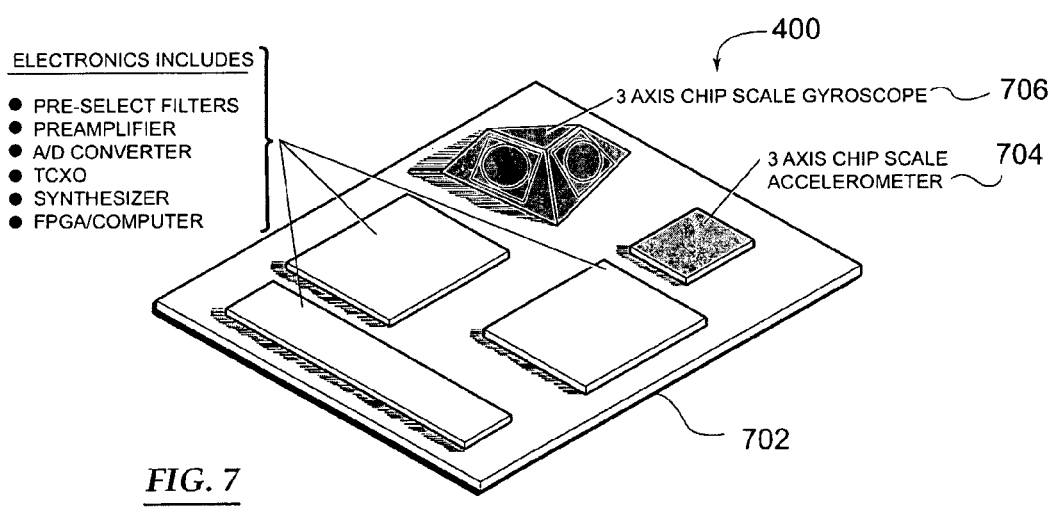
FIG. 7 is an exemplary receiver configuration in accordance with one embodiment of the present invention.

In a preferred embodiment, the entire iGPS receiver 400 is architected at the chip level as shown in FIG. 7. That is, a receiver card 702 includes a 3-axis chip-scale accelerometer 704, a 3-axis chip-scale gyroscope 706, and various other components, e.g., pre-select filters, a preamplifier, one or more A/D converters, a TCXO, a synthesizer, and a FPGA/Computer, as described in conjunction with FIGS. 4-6. These components may be distributed on board 702 in accordance with known techniques and in any suitable manner.

Another key rationale that will be seen in the description below is that MEMS technology can also be engineered to offer low random noise—the largest error source related to this invention. Since iGPS will estimate out the biases in real time, the key remaining performance parameter will be random error, a parameter in which MEMS devices tend to excel—potentially even beyond those of state-of-the-art inertial grade IMUs. There are also potential future improvements in chip scale technology. Research and development in chip scale, room-temperature Bose-Einstein condensates for inertial devices holds significant promise. See, e.g., Jakob Reichel, "Atom Chips," Scientific American, February 2005, at p. 46.

Having thus given an overview of the various components of an exemplary embodiment, the basic functioning of a the invention will be described. First, the extended dwell signal processing technique for coherent detection is described. This is the basis for achieving high anti-jam (AJ) performance. Next, the system-level navigation processing that is used to achieve the high AJ performance is described. Finally, a preferred embodiment of the invention is described in detail, providing a general system and method for practical operation.

Extended Dwell Signal Processing

Figure 8:
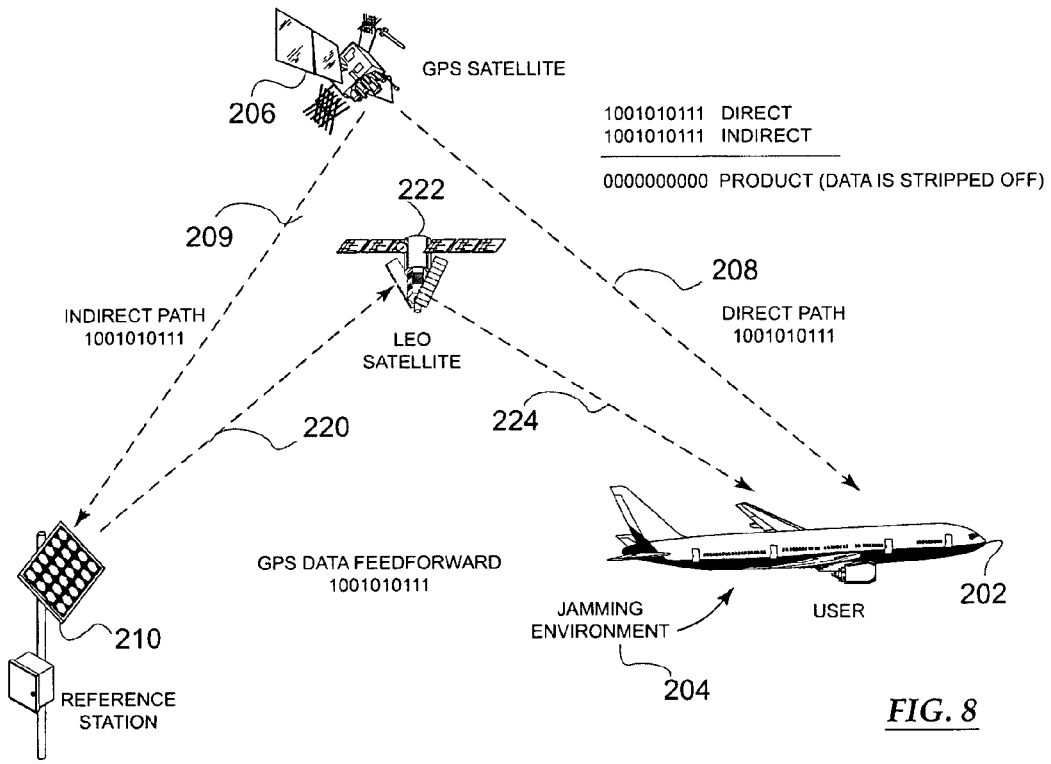
FIG. 8 is a schematic overview of an exemplary data-stripping process.

In a preferred embodiment, anti-jamming performance is accomplished in three basic steps: (i) datastripping, (ii) time synchronization, and (iii) coherent averaging. FIG. 8 illustrates the first step in the processing sequence. It is desired to remove the GPS data that is modulated on the carrier for a user 202 that happens to be operating in an area 204 of heavy interference. A reference station 210 in common view of a GPS satellite 206 that does not happen to be subject to jamming or interference is able to obtain a clear estimate of the 50 bps GPS data stream for that satellite. The LEO data link 220, 224 is used to telemeter the data across the data link to user 202 in real time at high power. User 202 then time-aligns his own received GPS signal 208 with the data stream 224 received from reference station 210 via GPS. By mixing these together, the 50 bps modulation is completely stripped off the signal.

The second step is to synchronize the user clock with a known reference. Because a typical quartz oscillator will drift by many GPS L1 wavelengths (19 cm) over a time period on the order of one second or more, it is not possible to carry out coherent integration of the GPS signal over such a time period. The clock synchronization is carried out by using LEO satellite 222 to transfer time from a known source at reference station 210 to user 202.

Reference station 210 has some access to GPS time because it is in view of a GPS satellite 206 which carries an accurate source of time. Because GPS satellites carry an atomic clock—nominally a Cesium clock—signal is highly likely to stay stable to better than $10^{-12}$ over the required 20 second averaging interval. However, relying on a measurement of GPS time directly from GPS is still subject to errors, including those from clock, ephemeris, and the atmosphere. In the preferred embodiment, the GPS satellites that are incorporated in the user's position fix are treated as common view between the reference and the user receivers. GPS time then drops out in this differential mode.

Precise time at user 202 (i.e., at the user receiver) is first obtained by carrying out common mode ranging of LEO satellite 222 between reference station 210 and user 202. The carrier ranging equation from the user satellite is $$\phi = \rho + \delta\rho + \tau_s - \tau_r + b_0 + \rho_t - \rho_i + \rho_m + \epsilon$$

where $\rho$ is the estimated range to the satellite, $\delta\rho$ is the error in estimated range, $\tau_s$ is the satellite clock offset, $\tau_r$ is the receiver clock offset, $b_0$ is the aggregate ranging bias (including integer and real-valued ambiguity components and all hardware delays), and $\rho$ subscript t, i, and m, are the errors due to troposphere, ionosphere, and multipath, respectively. The error, $\epsilon$, is the contribution from receiver noise.

Many of these parameters are known or partly known in advance (i.e., a priori). Furthermore, it can be safely assumed that many of the parameters can be bounded so that they will not likely change by more than a centimeter over a 20 second interval. The centimeter-level metric is employed interchangeably with a 30 picosecond time standard in dealing with GPS carrier phase because 30 picoseconds is the amount of time that light takes to traverse one centimeter. The reference station location is assumed to be known to centimeter level accuracy. For the purposes of the following derivation, it will be assumed that both the LEO satellite position and the user position are initialized to within 10 cm of error. However, it will be shown later that this condition can be relaxed considerably to several 10s of meters or more.

Using relative aiding information from the user inertial, it is possible to track the user position in a relative sense to better than a centimeter over the 20 second interval. Therefore, the relative accuracy obtained by differencing the user range measurement to the LEO satellite from the reference station measurement results in the following expression:

$$\Delta\varphi^{LEO} = [\varphi^{LEO}_{user} - \rho^{LEO}_{user}] - [\varphi^{LEO}_{reference} - \rho^{LEO}_{reference}] + \Delta b$$

$$= [\varphi^{LEO}_{user} - \|\hat{x}_{user}(t) - x_{LEO}(t)\|_2] - [\varphi^{LEO}_{reference} - \|x_{reference} - x_{LEO}(t)\|_2] + \Delta b$$

$$= \Delta\delta\rho + \tau_{LEO} - \tau_{user} - \tau_{LEO} + \tau_{reference} + \Delta b + \Delta\rho_i - \Delta\rho_i + \Delta\rho_m + \Delta\varepsilon$$

$$= \tau_{reference} - \tau_{user} + \Delta b + O\{<30 \text{ picoseconds}\}|_{20 seconds}.$$

The superscript designates the transmitter. The subscript designates the receiver. Most notably, when the user forms the above difference, the spacecraft clock cancels out perfectly. For the time being we assume a near-perfect ephemeris. This will be revisited below.

Figure 9:
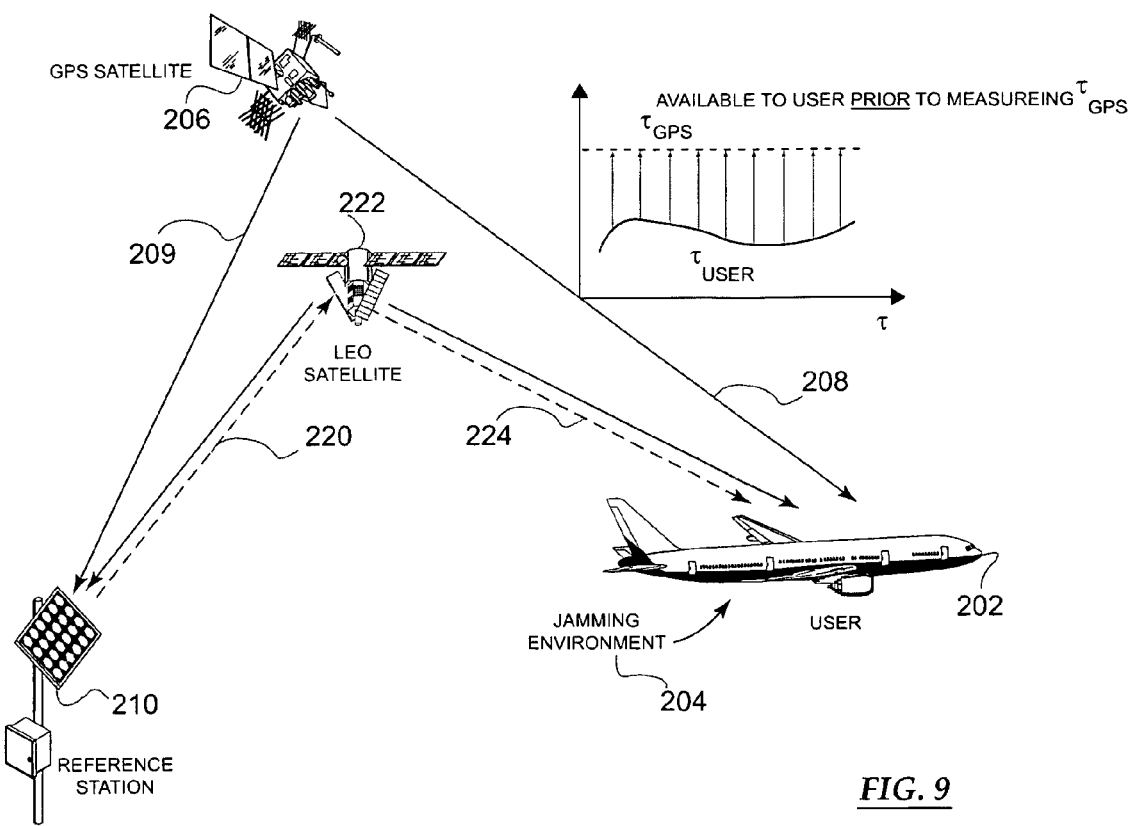
FIG. 9 is a schematic overview of an exemplary time-transfer process.

What remain of the single difference are bias terms whose variations are bounded to be on the order of less than a centimeter over the 20 second interval. As shown in FIG. 9, reference station 210 has its own imperfect measure of time. That is, reference station 210 measures the LEO satellite 222 signal carrier phase. It then transmits this measurement data through LEO satellite data link 220, 224 to user 202. The user equipment also makes a measurement of the LEO satellite signal carrier phase. By the above relationship, the $\Delta\phi$ difference can be formed by the user equipment to provide the exact offset between the reference and user clocks. In fact, the user receiver carries out a virtual reconstruction of the reference station clock by adding $\Delta\phi$ to the user receiver clock.

Several aspects of this development are notable. First, time precise to better than $10^{-12}$ over 20 seconds has been transferred using a LEO satellite that carries no atomic clock. Iridium and Globalstar carry only space qualified quartz oscillators, yet this level of time transfer is possible because the satellite clock term drops out precisely at each epoch. Second, the precise level of time knowledge is available to user 202 in spite of the presence of severe jamming. Again, this is possible because the LEO signal is significantly more powerful than that of GPS. Last, the precise time is available to the user equipment without the use of an exotic clock. The user only requires a low cost TCXO and can operate in the presence of significant user vibration.

The next step is to use the transferred time to form a feed forward prediction of the carrier phase for each GPS satellite to be tracked. Since the satellites may be too weak to track by themselves, the receiver must use the aiding information to preposition the tracking loops within a centimeter of the expected phase. Using common-view time transfer, the relationship between the GPS satellite phase measured at the reference station and that about to be measured at the user is given by $$\Delta\varphi^{GPS} = [\varphi^{GPS}_{user} - \rho^{GPS}_{user}] - [\varphi^{GPS}_{reference} - \rho^{GPS}_{reference}] + \Delta b$$

$$= [\varphi^{GPS}_{user} - \|\hat{x}_{user}(t) - x_{GPS}(t)\|_2] - [\varphi^{GPS}_{reference} - \|x_{reference} - x_{GPS}(t)\|_2] + \Delta b$$

$$= \Delta\delta\rho + \tau_{GPS} - \tau_{user} - \tau_{GPS} + \tau_{reference} + \Delta b + \Delta\rho_i - \Delta\rho_i + \Delta\rho_m + \Delta\varepsilon$$

$$= \tau_{reference} - \tau_{user} + \Delta b + O\{<30 \text{ picoseconds}\}$$

where the measured difference corrected for satellite motion ends up being simply the difference between the reference and the user clock. The GPS satellite clock will cancel out because it is common mode.

It is now possible to solve the above equation for the a priori estimated GPS carrier phase as measured by the user, $\overline{\varphi}_{user}{}^{GPS}$. It is given as follows to within roughly a centimeter of accuracy in terms of known quantities.

$$\Delta\varphi^{GPS} = [\varphi^{GPS}_{user} - \rho^{GPS}_{user}] - [\varphi^{GPS}_{reference} - \rho^{GPS}_{reference}] =$$

$$\tau_{reference} - \tau_{user} + \Delta b + O\{<30 \text{ picoseconds}\}$$

$$\overline{\varphi}^{GPS}_{user} = \rho^{GPS}_{user} + [\varphi^{GPS}_{reference} - \rho^{GPS}_{reference}] +$$

$$\tau_{reference} - \tau_{user} + \Delta b + O\{<30 \text{ picoseconds}\}$$

$$= \rho^{GPS}_{user} + [\varphi^{GPS}_{reference} - \rho^{GPS}_{reference}] +$$

$$\Delta\varphi^{LEO} + \Delta b + O\{<30 \text{ picoseconds}\}$$

The expected carrier phase is the sum of the reference phase corrected for GPS satellite and user motion and the time transfer correction provided by the LEO satellite link.

The third step in the method is coherent averaging of the incoming GPS carrier against the newly formed virtual stable time base. Because all of the GPS code, carrier, and data have been removed, and because the inertial navigation unit has been used to remove remaining relative motion, the only residual modulation on the GPS carrier should be that due to gyro and accelerometer noise and biases.

$$\Delta\phi = \Delta\phi^{GPS} - \Delta\phi^{LEO} = \phi_{user}{}^{GPS} - \overline{\phi}_{user}{}^{GPS} = b + O\{<30 \text{ picoseconds}\}$$

The bias term, b, represents an aggregate of all integer and slowly changing electronic biases contributing to a particular double difference. In the presence of jamming, the invention effectively works to estimate these bias signals—however faint the carrier should be—to recover this critical information. Because the signals are provided in carrier phase, they provide an extraordinarily high fidelity, centimeter-level measurement of the inertial parameters.

In the time domain, the longer the averaging interval, the lower the residual noise is driven while the signal remains constant. In the frequency domain, the ultra-narrowband (quasi-static) In-phase (I) and Quadrature (Q) carrier phase is low pass filtered—perfectly matched to DC. The noise due to jamming is removed while passing the signal at zero frequency. A quantitative description of the process is that the residual integration noise is given by the white noise equation:

$$\sigma^2 = \frac{J_0}{2S_\tau}$$

By this method, it is possible to gain significant anti-jam improvement over GPS. If the LEO power is sufficient to allow the aiding information to drive past the jamming, and if the user carries an inertial navigation unit that is capable of maintaining <1 cm of drift over 20 seconds, then the coherent integration time of GPS signals extends from 20 ms to 20 sec—an improvement of 30 dB. Furthermore, this is not a hard upper limit of the present invention.

System-Level Navigation Processing

In accordance with one embodiment, a "brute force" double difference method of combining the measurements is used. While this approach is illustrative, it will be shown that in practice it has certain drawbacks compared with the preferred embodiment described below. In this example, LEO phase measurements are directly subtracted from each GPS channel prior to correlation. Each GPS channel outputs residual phase measurements, providing the double difference (GPS minus LEO, user minus reference) remainder between the actual and the predicted phase of the GPS satellite signal as received by the user.

The inertial unit keeps track of the user position. However, the inertial unit will generally accumulate a nominal vector position error in the local horizontal user frame for a given nominal position estimate, $x_0$. The phase measurements can be linearized about this nominal local horizontal inertial user position to find a best vector estimate $\delta x$ using GPS of the inertial position error.

$$\Delta\varphi = \varphi_{user}^{GPS} - \bar{\varphi}_{user}^{GPS}$$
$$= [\varphi_{user}^{GPS} - \|x_0 - x_{GPS}\|_2 + \hat{s}_{GPS}^T \delta x] - [\varphi_{reference}^{GPS} - \rho_{reference}^{GPS}] -$$
$$[\varphi_{user}^{LEO} - \|x_0 - x_{LEO}\|_2 + \hat{s}_{LEO}^T \delta x] + [\varphi_{reference}^{LEO} - \rho_{reference}^{LEO}] + b + v$$

where $v$ is the measurement noise. Next, we can define and regroup terms, $$\delta\varphi \equiv -\Delta\phi + \varphi_{user}^{GPS} - \|x_0 - x_{GPS}\|_2 - \varphi_{reference}^{GPS} + \rho_{reference}^{GPS} -$$
$$\varphi_{user}^{LEO} + \|x_0 - x_{LEO}\|_2 + \varphi_{reference}^{LEO} - \rho_{reference}^{LEO}$$
$$= -\hat{s}_{GPS}^T \delta x + \hat{s}_{LEO}^T \delta x + b + v$$

where $\hat{s}$ is the unit vector to the indicated satellite in the local horizontal frame. Since the phase measurement is a double difference, no clock component remains. Consolidating terms, $$\delta\phi = -(\bar{s}_{GPS} - \bar{s}_{LEO})^T \delta x + b + v$$

Stacking differential phase measurements for n GPS satellites in view, the resulting system of equations may be defined:

$$\delta\phi = -(S_{GPS} - \bar{s}_{LEO}[1\ 1\ \ldots\ 1])^T \delta x + \beta + v$$

where $\delta\phi_{GPS} = [\delta\phi_{(n)}\ \delta\phi_{(n-1)}\ \ldots\ \delta\phi_{(1)}]^T$
$S_{GPS} = [\hat{s}_{GPS(n)}\ \hat{s}_{GPS(n-1)}\ \ldots\ \hat{s}_{GPS(1)}]$
$\beta = [b_{(n)}\ b_{(n-1)}\ \ldots\ b_{(1)}]^T$ For simplicity, the system may be assumed to be initialized and operating under normal conditions in the clear prior to being operated under jamming. However, given sufficient processing power, there is nothing to prevent the system from acquiring lock under jamming.

The biases may be approximately initialized using a code-based solution for the position $x_0$. Then, substituting $\delta x=0$, $\beta=\delta\phi|_{t_0}$. From then on, coherent carrier phase tracking commences using the inertial unit to remove dynamics at the centimeter level using the following integrated approach. The phase measurements provide a centimeter-level indication of how far the inertial has drifted.

If the biases are assumed to be constant, the position error can be obtained in the presence of interference and/or jamming by simply solving the system of equations for the user position error using a linear least squares fit to minimize the cost function:

$$\min_{\delta x} \|H\delta x - y\|_2$$

where:

$H = -(S_{GPS} - \hat{s}_{LEO}[1\ 1\ \ldots\ 1])^T$
$y = \delta\phi - \beta$

The vector $\delta x$ is the estimated position error with respect to $x_0$ following each PDI. In practice, a simple correction is not satisfactory because the model does not include all the error sources in satellite ranging described above. However, by allowing the biases to float, the changing geometry due to satellite motion generally allows both the position and biases to be observable. Depending on the exact satellite geometry, the biases will generally be observable, and therefore, will pinpoint the exact position of the user. Typically, with the large angle motion of the LEO satellite over the user, there is enough change in geometry to determine two out of the three components of position to within centimeters within time scales on the order of one minute. If two or more LEO satellites are used, as shown below, all three components of position may be solved within roughly the order of a minute.

In circumstances where anti-jam performance is required, but centimeter-level accuracy is not needed, the system may also allow the model error states to absorb certain errors. This behavior is appropriate, given the characteristic of an estimator to minimize error residuals. Therefore, estimators will still tend to perform reasonably even in the presence of moderate modeling errors. The basic filtering approach is also capable of absorbing slowly changing, bias-like error sources, including but not limited to user, reference, and satellite position errors, atmospheric and ionosphere biases, and multipath. For example, it can be shown that an ephemeris error, $\delta r$, in the LEO satellite will produce a common-mode bias in the above observation equation.

$$\delta\phi = -(S_{GPS} - \hat{s}_{LEO/user}[1\ 1\ \ldots\ 1])^T \delta x - ([\hat{s}_{LEO/user} - \hat{s}_{LEO/ref}][1\ 1\ \ldots\ 1])^T \delta r + \beta + \delta\beta + v$$

The modified least squares solution for a single epoch becomes $$\min_{\delta x}\|H\delta x - y - ([\hat{s}_{LEO/user} - \hat{s}_{LEO/ref}][1 \ 1 \ \ldots \ 1])^T \delta r + \delta\beta\|_2$$

Subtracting the original unperturbed cost function, $$\min_{\delta x}\left\|-\begin{bmatrix}1\\ \vdots \\ 1\end{bmatrix}[\hat{s}_{LEO/user} - \hat{s}_{LEO/ref}]^T \delta r + \delta\beta\right\|_2$$

the argument of which vanishes for $$\delta\beta = \begin{bmatrix}1\\ \vdots \\ 1\end{bmatrix}[\hat{s}_{LEO/user} - \hat{s}_{LEO/ref}]^T \delta r$$

This same result follows for its time derivatives. In general, if the user is able to tolerate modest departures from centimeter-level accuracy for jam resistant operations, this development provides an existence proof of a common-mode bias rate that will enable extended integration over the interval required for anti-jam. In other words, various error sources can be set up to be accommodated automatically. The key is applying an estimator that can track out the common mode bias component so as to successfully enable extended pre-detection intervals in the presence of jamming.

PREFERRED EMBODIMENT ARCHITECTURE

In the preferred embodiment, the bulk of the signal processing is carried out in a software receiver implementation, and the following discussion will assume as such. However, the invention may be implemented using any combination of hardware and software as may be appropriate given the particular circumstances.

FIG. 1 shows a top level representation of a preferred processing structure. The architecture relies extensively on precise feed forward estimates of the carrier phase for the system receivers, and should be routed about the user receiver on a timely and accurate basis. These aiding signals are generated by a Navigation Processor 110 on an a priori basis. Once these signals are available throughout the receiver, lock in jamming conditions can proceed.

The signals are generally processed from left to right in the figure. The first step is to perform excision, as represented by STAP (or SFAP) modules 104 (a)-(c). Since each input band will end up with a separate jamming scenario and antenna biases, a separate STAP module 104 acts separately on each band, i.e., GPS L1, GPS L2, and LEO. Each STAP module 104 is aided by feed forward of the vehicle attitude, since adaptive beamforming is more effective if the attitude of the vehicle is known.

The next system block is the bank of tracking channels 106(a)-(c), one for each combination of satellite and band. Sufficient processing resources are preferably allocated to accommodate at least 12 GPS satellite channels for each band, L1 and L2, and at least 3 LEO channels. Each channel accepts a feed forward signal from Extended Kalman Filter 108 at 50 Hz, comprising an a priori estimate of the incoming receiver phase.

Unlike a traditional GPS receiver, in which each channel has a dedicated tracking loop, the preferred embodiment creates a centralized regulator in Extended Kalman Filter 108. This system block may propagate more than 40 unified state variables, modeling each correlator, the INS, the aggregate tracking loop state, and the user clock.

Figure 10:
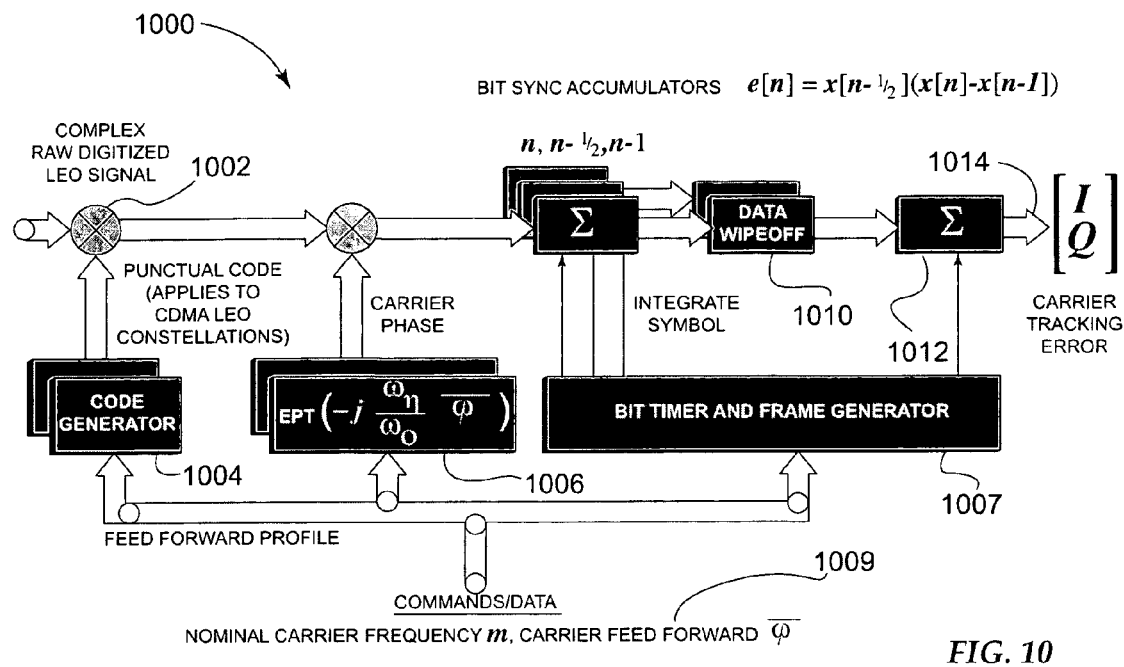
FIG. 10 is a functional block diagram of an exemplary low-earth-orbit (LEO) correlator.

FIG. 10 shows an example of a correlator for an LEO satellite. In general, correlator 1000 includes code generator 1004, functional block 1006, bit timer and frame generator block 1007, accumulators 1008, data wipe-off block 1010, and integrator block 1012 configured as shown, wherein blocks 1004, 1006, and 1007 receive various commands and data 1009 described further below.

The tracking loop maintains carrier lock, bit synchronization, and frame synchronization, as well as data demodulation. In this regard, the complex signal samples 1002 are processed from left to right. For Spread Spectrum LEO constellations such as the CDMA Globalstar, the feed forward code is wiped off the incoming signal. Next, the incoming carrier phase feed forward prediction is converted into a complex rotation that unwinds the incoming residual data-modulated signal, downconverting it to baseband.

For bit synchronization, a Gardner algorithm is applied, creating a discriminator based on three consecutive integration intervals separated by half a symbol period. Frame synchronization is applied by searching for a predetermined symbol sequence. For carrier tracking, the QPSK data is then wiped off. Over a specified interval in the frame, each LEO satellite broadcasts data. The channel is designed to integrate this energy into In-phase (I) and Quadrature (Q) carrier phase error tracking components (1014). These raw I's and Q's are routed to the Navigation Preprocessor (item 110 in FIG. 1) for conversion into carrier phase tracking error angle and incorporation into the Extended Kalman Filter (item 108 in FIG. 1). The LEO raw output rate is generally 10 Hz or faster, even under high jamming, because of the high LEO broadcast power.

Figure 11:
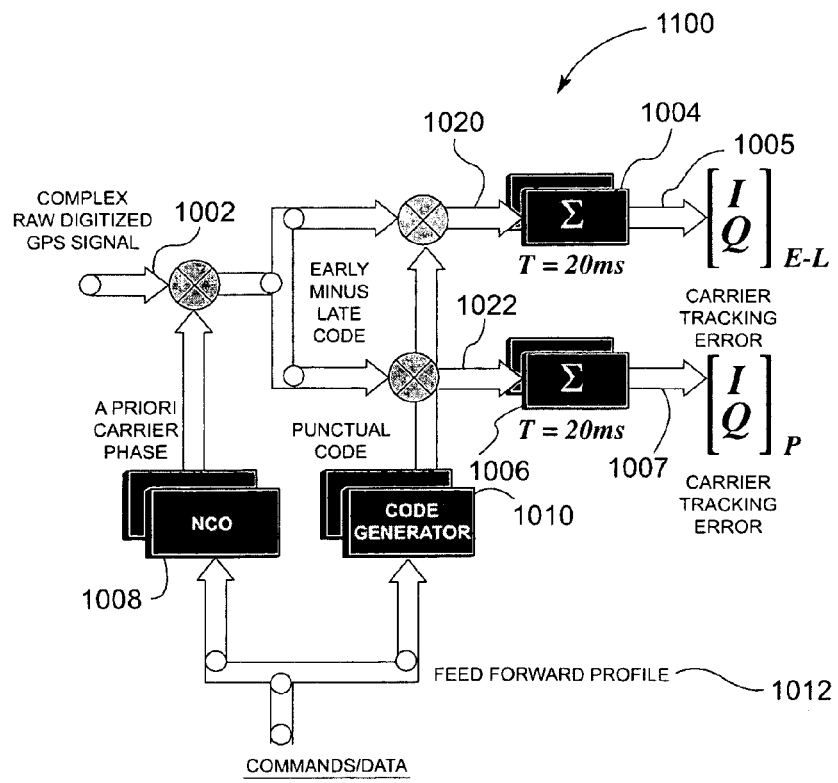
FIG. 11 is a functional block diagram of an exemplary GPS correlator.

FIG. 11 shows an exemplary GPS correlator architecture 1100, which generally includes an NCO 1008, a code generator 1010, and integrators 1004 and 1006 configured as shown. Again, the complex signal samples 1002 are processed from left to right. The signal first undergoes wipe-off of both the code and the feed forward carrier, rotating and precisely downconverting the carrier nearly exactly to zero frequency. The feedforward corrections are generated by the Navigation Preprocessor (item 110 in FIG. 1) and consist of contributions from the user clock estimate (indirectly derived from the LEO tracking), the streaming feed forward ephemeris, and the instantaneous estimate of the user position made by the INS as updated by GPS. At this point, the residual carrier is effectively quasi-static. All phase rotation has been effectively removed, but for residual system biases and 50 bps GPS data modulation.

With continued reference to FIG. 11, two half channels are grouped together to form a complete tracking channel with both code and carrier I and Q measurements. The PRN generator of the upper half channel is commanded to output Early minus Late (E−L) code 1020, while that of the lower half channel is commanded to output Punctual code 1020. All channel correlator output is routed to the Navigation Preprocessor (item 110 in FIG. 1) for incorporation into the navigation solution.

Figure 12:
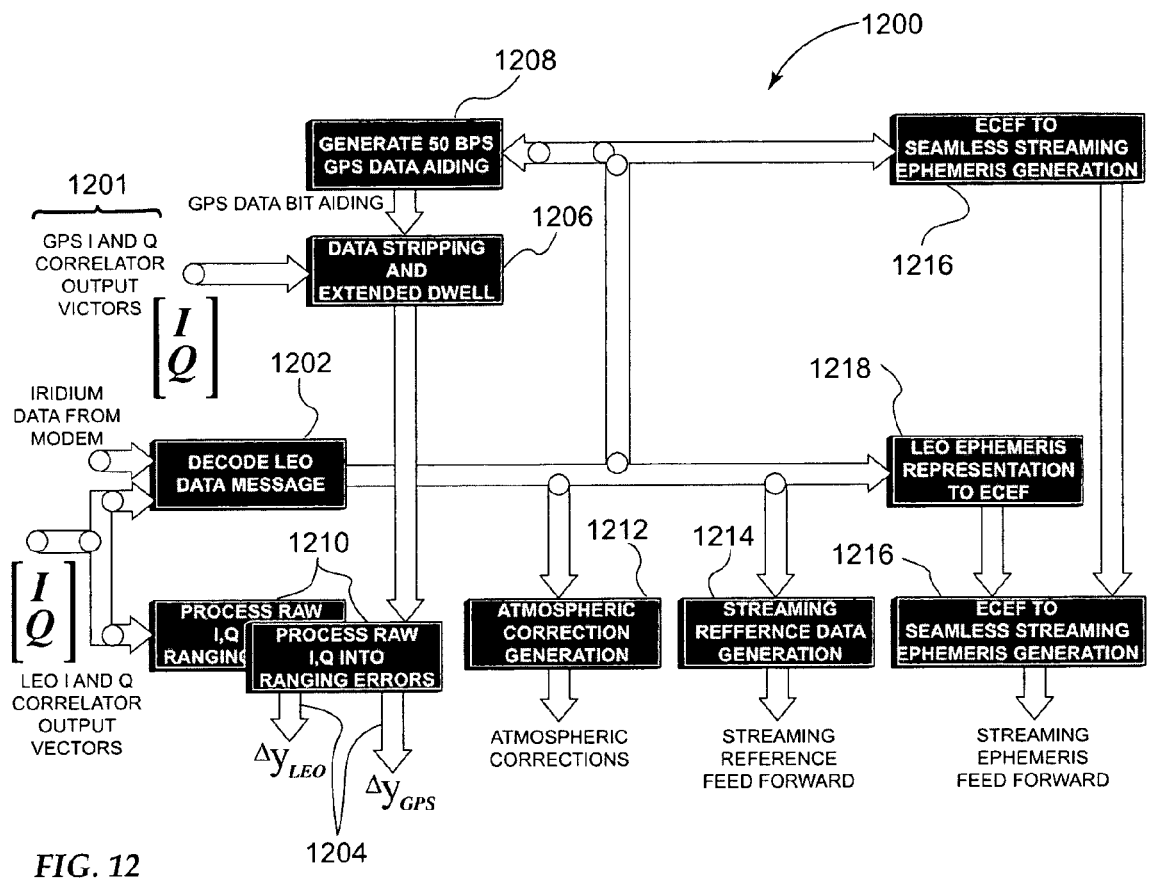
FIG. 12 is a functional block diagram of an exemplary navigation processor.

FIG. 12 shows exemplary Navigation support functions. This graphic shows, schematically, the various operations performed on the incoming data 1201 by system 1200. In general, system 1200 includes the following function blocks: GPS data aiding block 1208, data stripping and extended dwell block 1206, decoding block 1202, ranging error blocks 1210, atmospheric correction block 1212, streaming reference data block 1214, ephemeris generation block 1216, LEO ephemeris to ECEF block 1218, and GPS ephemeris to ECEF block 1216. The Navigation Preprocessor uses the raw I's and Q's from the correlators for two key purposes: (i) streaming feed forward aiding generation and (ii) ranging measurement conversion.

For the feed forward function, the Navigation Preprocessor decodes the data stream arriving from the LEO satellites (1202). This data contains an encoded message that can be used to produce (i) the 50 bps feed forward GPS data aiding stream, (ii) the ground reference measurements, and (iii) streaming ephemeris feed forward predictions.

For the ranging measurement conversion, the raw I and Q measurements are converted from raw form into range errors 1204. Because the GPS signals are so weak in the case of jamming, the GPS I's and Q's are first accumulated in block 1206 described below. Then, both the LEO and GPS I's and Q's are converted to range errors 1204 via the following calculations:

Phase Ranging Error: $\Delta\phi = a\tan_2(Q_P, I_P)$

Code Ranging Error: $\Delta\rho = \dfrac{[I\ Q]_P \begin{bmatrix} I \\ Q \end{bmatrix}_{E-L}}{\sqrt{[I\ Q]_P \begin{bmatrix} I \\ Q \end{bmatrix}_P}}$ Although the primary emphasis is on the carrier phase in this invention, it is important to note that the squaring losses associated with the previously discussed code ranging discriminator do not apply to this new coherent code phase discriminator provided here. Unlike a code-only discriminator wherein the averaging interval increases as the square of J/S, this discriminator reduces the averaging interval to a simple proportionality to J/S. The performance improvement is dramatic.

The resulting coherent receiver can take full advantage of both the code and carrier attributes. As long as the receiver maintains carrier lock—even under extreme jamming conditions—it is also able to offer code measurements that can be used for any traditional GPS or satellite navigation purpose, including, but not limited to, ordinary position fixes, differential position fixes, and resolution of GPS time. Furthermore, it will be apparent to those with skills in the art that various techniques used to improve code performance, such as variable-chip and multiple-chip correlator spacing are applicable or compatible with this anti-jam system.

Figure 13:
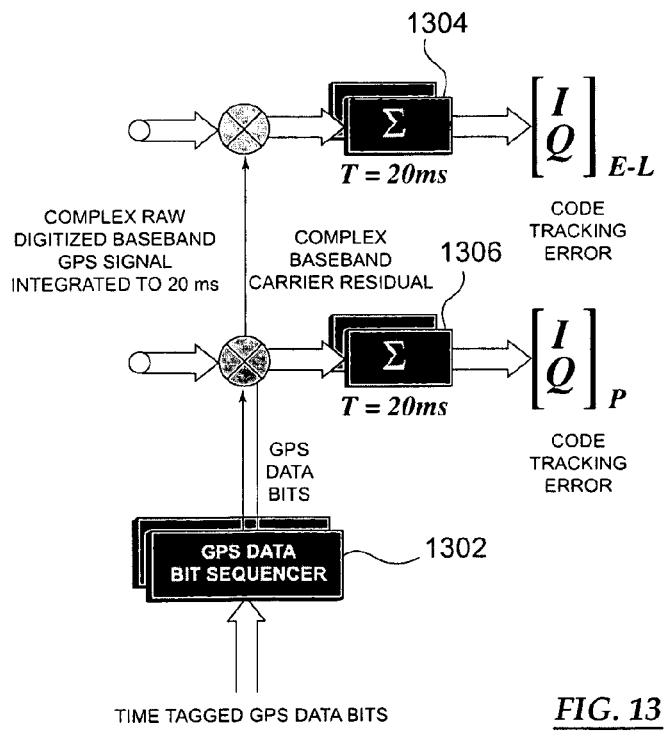
FIG. 13 is a functional block diagram of an extended dwell process.

FIG. 13 shows an exemplary method for further accumulation of the 20 ms GPS samples into longer integration times. As shown, a GPS data bit sequencer 1302 aligns the a priori known data bits with the incoming I and Q measurements to strip off the data modulation. For other Global Navigation Satellite Systems (GNSS), such as future versions of GPS, any form of symbol modulation can be removed in an identical manner. Then, the quasi-static measurements are averaged over the pre-detection interval (via blocks 1304 and 1306). The PDI is a long period, for example 5, 10, or 20 seconds in the preferred embodiment, corresponding to the longer coherent integration time that is a function of the jamming level.

A full complement of correlator output measurements from both the LEO and GPS tracking channels is the basis for a system state update. Should more than one LEO measurement be available in between full updates, it is possible to update a subspace of the position states at the LEO update rate and incorporate them into the overall navigation solution. If only a single LEO satellite is available, only the user clock is updated.

The Inertial Processor (112 in FIG. 1) takes the raw inertial data 111 as an input, corrects for pre-calibrated errors including misalignment, applies the bias state estimates, and performs strapdown and navigation algorithms to compute high-bandwidth user position and attitude 113. The output of inertial preprocessor 112 provides both the high-bandwidth position and attitude output for the system as well as aiding data for the signal processing.

Figure 14:
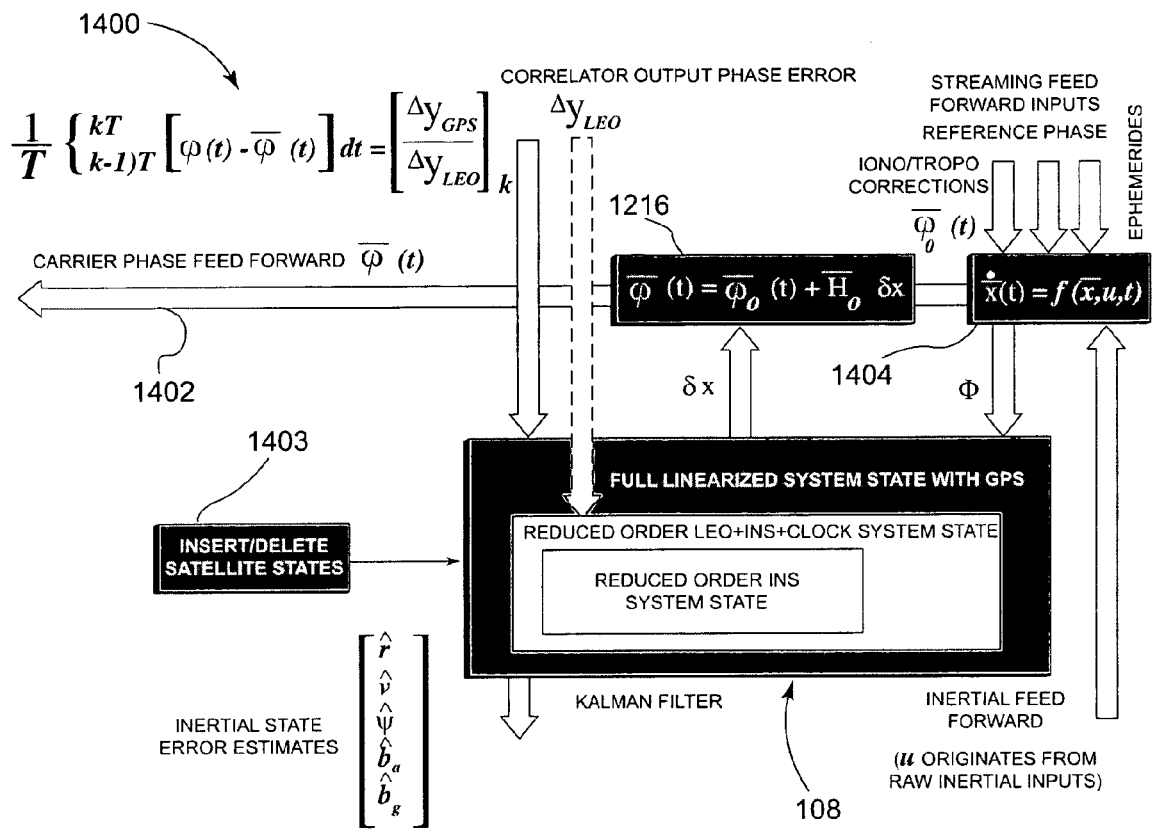
FIG. 14 is a functional block diagram an extended Kalman filter.

Another aspect of the invention is the central regulator shown in FIG. 14. In general, regulator 1400 includes Kalman filter 108 which is communicatively coupled with functional blocks 1405, 1403, and 1404, and which interacts with the various signals previously described as shown in the figure. To provide the advertised jamming protection, the receiver requires an extremely accurate model of the system, in many cases good to the sub-centimeter level over a large dynamic range. This tolerance, expressed in terms of both accuracy and timeliness, is especially important for the ephemeredes, the reference phase measurements, and the inertial output. The complete system model (nested items 410, 412, and 1414) resides inside the Extended Kalman Filter 108 which therefore generates the carrier phase feed forward signal 1402 to all correlators in the receiver as shown.

One key for proper functioning of the anti-jam system is to keep the bias estimates within tolerance. The filter harvests all correlator measurements and combines the navigation solution with the inertial solution to determine the inertial bias residuals. During a full system update when the GPS correlator output becomes available, the overall system Extended Kalman Filter state is updated, and new biases are applied to the inertial output.

The following sections describe the various aspects of the high-performance system model that is required to attain the tolerances necessary for anti-jam operation.

The estimator of a preferred embodiment is structured to directly estimate the position error, user clock time, and all ranging biases. This approach is taken a step further to feed forward the exact carrier phase as it will be received by each correlator. Starting from a general single difference form, the observation model can be constructed as follows for a single satellite measurement, either GPS or LEO:

$$\Delta\varphi = [\varphi_{user} - \rho_{user}] - \lfloor \varphi_{reference} - \rho_{reference} \rfloor = b + \tau_{reference} - \tau_{user} + \rho_i - \rho_i + v$$

$$\varphi_{user}(t) = \|x_0(t) - x_{sat}(t)\|_2 - \hat{s}^T \delta x + [\varphi_{reference}(t) - \rho_{reference}(t)] + b - \Delta\tau + \rho_i - \rho_i + v$$

$$= \Delta\varphi|_{x_0} - \hat{s}^T \delta x + b - \Delta\tau + v$$

where the user position x is linearized about the nominal antenna position $x_0$ supplied by the INS, where the atmospheric error terms are taken to be associated with the satellite to user downlink, and where b is a general aggregate bias that includes all unmodeled effects, including cycle ambiguities and electronic biases. Further definitions are given as $x(t) = x_0(t) + \delta x$ $\Delta\phi|_{x_0} = \|x_0(t) - x_{sat}(t)\|_2 + [\phi_{reference}(t) - \rho_{reference}(t)] + \rho_i - \rho_i$ $\Delta\tau = \tau_{user} - \tau_{reference}$ Atmospheric error corrections, obtained either through a model or through direct measurements, are also applied to the raw single difference. It is assumed that $\tau_{reference}$ and the reference link atmosphere errors are precisely known for the ground reference stations by applying well-known network techniques. See, e.g., W. I. Bertiger, Y. E. Bar-Sever, B. J. Haines, B. A. Iijima, S. M. Lichten, U. J. Lindqwister, A. J. Mannucci, R. J. Muelerschoen, T. N. Munson, A. W. Moore, L. J. Romans, B. D. Wilson, S. C. Wu, T. P. Yunck, G.

Piesinger, and M. L. Whitehead, "A Prototype Real-Time Wide Area Differential GPS System", *Navigation: Journal of the Institute of Navigation*, Vol. 44, No. 4, 1998, pp. 433-447. The user measurements are then stacked to form a linear set of observations as follows:

$$\varphi(t) = \Delta\varphi|_{x_0} - S^T \delta x + \beta - \begin{bmatrix} 1 \\ 1 \\ \vdots \\ 1 \end{bmatrix} \Delta\tau + v_\varphi$$

where:

$$\varphi(t) = [\varphi_n(t)\varphi_{n-1}(t) \ldots \varphi_2(t)\varphi_1(t)]$$
$$= [\varphi_{GPS(n)}(t) \ldots \varphi_{GPS(l)}(t) | \varphi_{LEO(m)}(t) \ldots \varphi_{LEO(l)}(t)]^T$$
$$= \begin{bmatrix} \varphi_{GPS}(t) \\ \varphi_{LEO}(t) \end{bmatrix}$$

and $$\Delta\varphi|_{x_0} = [\Delta\varphi|_{x_0}^{(n)} \Delta\varphi|_{x_0}^{(n-1)} \ldots \Delta\varphi|_{x_0}^{(2)} \Delta\varphi|_{x_0}^{(1)}]^T = \begin{bmatrix} \Delta\varphi|_{x_0}^{(GPS)} \\ \Delta\varphi|_{x_0}^{(LEO)} \end{bmatrix}$$

$$S = [\hat{s}_n \hat{s}_{n-1} \ldots \hat{s}_2 \hat{s}_1]$$
$$= [\hat{s}_{GPS(n)} \ldots \hat{s}_{GPS(l)} | \hat{s}_{LEO(m)} \ldots \hat{s}_{LEO(l)}]$$
$$= [S_{GPS} | S_{LEO}]$$

$$\beta = [b_n b_{n-1} \ldots b_2 b_1]^T = \begin{bmatrix} \beta_{GPS} \\ \beta_{LEO} \end{bmatrix}$$

$$v_\varphi = [v_n v_{n-1} \ldots v_2 v_1]^T = \begin{bmatrix} v_{GPS} \\ v_{LEO} \end{bmatrix}$$

In this representation the satellite geometry matrix is now generalized to any GPS or LEO satellite, the bias vector, β, corresponds to the satellite biases for each GPS or LEO satellite, and the time bias, Δτ, corresponds to the single difference clock bias ($\tau_{user} - \tau_{reference}$).

In accordance with one aspect of this invention, the GPS and LEO satellites are partitioned in the state space representation. On one hand, GPS satellites must be treated interchangeably with LEO satellites to the extent that they collectively enhance geometry when occlusion conditions prevail. Furthermore, the structure must also accommodate a separate and faster update rate for the higher-power LEO state variables which may typically range from one to three in view. To maximize effectiveness under jamming, the system and method must truly exhibit optimal properties.

Before this representation can be used, it must be noted that the common mode of the bias states is indistinguishable from the clock bias for single difference carrier phase observables. The brute force approach to defining the state variables would involve choosing a particular satellite as the "master" satellite and subtracting that geometry and clock bias from all the others as initially shown above. Unfortunately, this approach creates an undesirable unequal outcome that weights the satellites and measurements in a non-interchangeable way. The position solution is affected by the choice of which satellite is the master. Not only is the brute force approach troublesome to implement with changing geometry and the possibility that there may be two or more LEO satellites available, the solution is not optimal, and is not well-suited for creating a system that is capable of handling the entire spectrum of required performance ranging from high jamming scenarios to occluded environments.

The latter case produces a constantly changing set of satellites being tracked and is therefore incompatible with designation of a master satellite.

To prevent numerical difficulties, it is desirable to create a new clearly defined set of bias modes in state variable form. A new set of bias and clock states are defined to (i) absorb the unobservable mode and (ii) render a set of orthonormal bias states that are also orthogonal to the common mode.

First, the common-mode normalized basis vector is defined:

$$v_{||} = \frac{1}{\sqrt{n}} [1\ 1\ \ldots\ 1]^T$$

where n is the number of ranging measurements available. The common mode bias contribution is determined by defining the projection $\beta_{||} \equiv v_{||}^T \beta$. What is then needed is a way to find an orthonormal basis, $V_\perp(n \times n-1)$, to span the space orthogonal to $v_{||}$, i.e., $v_{||}^T \beta_\perp = 0$ and $$\begin{bmatrix} V_\perp^T \\ v_{||}^T \end{bmatrix} [V_\perp v_{||}] = \begin{bmatrix} V_\perp^T V_\perp & V_\perp^T v_{||} \\ v_{||}^T V_\perp & v_{||}^T v_{||} \end{bmatrix} = I_{n \times n}$$

The following derivation develops a unique generating function for $V_\perp$.

The orthogonal space can be derived by subtracting out from the bias vector β the common-mode contribution as follows:

$$\beta_\perp = [I_{n \times n} - v_{||} v_{||}^T] \beta$$

The basis $V_\perp$ may be found by employing the QR factorization, where Q is an orthonormal matrix and R is an upper triangular matrix (see, e.g., Gene H. Golub and Charles F. Van Loan, *Matrix Computations*, Third Edition, Johns Hopkins University Press, Baltimore, 2003, p. 223.), such that:

$$A = QR = I_{n \times n} - v_{||} v_{||}^T$$

In this case, the rank of A is n−1, and the orthonormal basis is then given by the first n−1 columns of Q $$V_\perp = [q_1\ q_2\ \ldots\ q_{n-1}]$$

While there are many non-unique solutions for $V_\perp$, the preferred embodiment has $V_\perp$ triangular in order to partition the LEO and GPS states which operate at different update rates. Based on the definition of A, it can be shown that the QR method does produce a $V_\perp$ that is lower triangular by noting that $$A^T A = (I_{n \times n} - v_{||} v_{||}^T)^T (I_{n \times n} - v_{||} v_{||}^T) = (I_{n \times n} - v_{||} v_{||}^T) = A$$

Because A is symmetric positive semi-definite and because of the symmetry of the Cholesky decomposition $LL^T = A^T A = A$ the first n−1 columns of Q will be lower triangular. We interpret this structure as a "balanced" basis for all the tracking loop modes for all satellites in view consistent with a separate state estimate for the user clock.

The desired characteristics for tracking are as follows: (i) separate out the user clock as an independent state estimate, (ii) establish an "all-in-view" measurement processing structure that treats each SV in a balanced, non-preferential manner, i.e., a solution that is independent of interchange or rotation of specific SVs and associated measurements within the structure, (iii) handle occlusions by allowing GPS satellites and LEO satellites to be processed non-preferentially and interchangeably, (iv) maintain an optimal solution in spite of frequent switching among satellites and vehicle antennas due to vehicle translation and rotation, (v) accommodate multi-rate partitioning of fast LEO measurements and slow GPS measurements, and (vi) ensure that the state variables are numerically well defined so as to be compatible with a robust Extended Kalman Filter implementation.

An example partitioning of bias states is given as follows for 5 GPS satellites in view and 1 LEO satellite in view:

$$\beta = \begin{bmatrix} \beta_{GPS} \\ \beta_{LEO} \end{bmatrix} = \begin{bmatrix} 5/\sqrt{30} & & & & & 1/\sqrt{6} \\ -1/\sqrt{30} & 4/\sqrt{20} & & & & 1/\sqrt{6} \\ -1/\sqrt{30} & -1/\sqrt{20} & 3/\sqrt{12} & & & 1/\sqrt{6} \\ -1/\sqrt{30} & -1/\sqrt{20} & -1/\sqrt{12} & 2/\sqrt{6} & & 1/\sqrt{6} \\ -1/\sqrt{30} & -1/\sqrt{20} & -1/\sqrt{12} & -1/\sqrt{6} & 1/\sqrt{2} & 1/\sqrt{6} \\ -1/\sqrt{30} & -1/\sqrt{20} & -1/\sqrt{12} & -1/\sqrt{6} & -1/\sqrt{2} & 1/\sqrt{6} \end{bmatrix} \begin{bmatrix} \beta_\perp \\ \beta_{||} \end{bmatrix}$$

$$= [V_\perp \mid v_{||}] \begin{bmatrix} \beta_\perp \\ \beta_{||} \end{bmatrix}$$

where the notation $\overline{\beta}_\perp$ indicates a vector of orthonormal bias modes having n−1 rows consistent with the dimensions of $V_\perp$.

The virtue of the orthonormal lower triangular structure becomes more readily apparent when multiple LEO satellites are in view. The LEO satellite states must be updated on a faster time frame than the GPS satellites, while at the same time it is necessary to treat each measurement in non-preferential, equally-weighted manner with respect to all other satellite measurements, both GPS and LEO. The following example shows an explicit generating function for the matrix Q for any number (GPS+LEO) of total satellites tracked, n. The example also illustrates partitioning for the case where there are 3 LEO satellites in view.

$$\beta = \begin{bmatrix} \beta_{GPS} \\ \beta_{LEO} \end{bmatrix} = \begin{bmatrix} \sqrt{(n-1)/n} & & & & & 1/\sqrt{n} \\ -1/\sqrt{n(n-1)} & \ddots & & & & \vdots \\ \vdots & \ddots & 3/\sqrt{12} & & & 1/\sqrt{n} \\ -1/\sqrt{n(n-1)} & \vdots & -1/\sqrt{12} & 2/\sqrt{6} & & 1/\sqrt{n} \\ -1/\sqrt{n(n-1)} & \vdots & -1/\sqrt{12} & -1/\sqrt{6} & 1/\sqrt{2} & 1/\sqrt{n} \\ -1/\sqrt{n(n-1)} & \vdots & -1/\sqrt{12} & -1/\sqrt{6} & -1/\sqrt{2} & 1/\sqrt{n} \end{bmatrix} \begin{bmatrix} \overline{\beta}_\perp^{(GPS)} \\ \overline{\beta}_\perp^{(LEO)} \\ \beta_{||} \end{bmatrix}$$

This triangular "V" orthonormal matrix structure allows the LEO tracking loop state updates to occur on a faster time schedule without intermixing the LEO tracking state variables with the GPS tracking state variables. The upper-center, block zeros of the preferred embodiment ensure that the relative GPS tracking modes are independent of the LEO tracking states. The lower left block matrix elements are all common mode with respect to the LEO satellites. Therefore, during the interim interval of extended GPS dwell while the LEO tracking loops are being rapidly updated, the GPS tracking states are rendered as passive, common-mode contributors to a new reduced order LEO tracking system:

$$\beta_{LEO} = \begin{bmatrix} 2/\sqrt{6} & 0 & 1/\sqrt{n} \\ -1\sqrt{6} & 1/\sqrt{2} & 1/\sqrt{n} \\ -1/\sqrt{6} & -1/\sqrt{2} & 1/\sqrt{n} \end{bmatrix} \begin{bmatrix} \beta_\perp^{(LEO)} \\ \beta_{||} \end{bmatrix} -$$

-continued $$\begin{bmatrix} 1 \\ 1 \\ 1 \end{bmatrix} [1/\sqrt{n(n-1)} \quad \ldots \quad 1/\sqrt{12}] \overline{\beta}_\perp^{(GPS)}$$

Returning to the full order system, the new bias mode definitions can be substituted for the particular satellite biases, $$\phi(t) = \Delta\phi|_{x_0} - S^T \delta x + V_\perp \overline{\beta}_\perp + v_{||}\beta_{||} - \sqrt{n}v_{||}\Delta\tau + v_\phi$$

Scaling $\beta_{||}$ according to $\overline{\beta}_{||} = \beta_{||}/\sqrt{n}$ and combining the common-mode bias and clock states into a new clock state $\overline{\tau} \equiv \Delta\tau - \overline{\beta}_{||}$, the resulting observation equation is $$\phi(t) = \Delta\phi|_{x_0} - S^T \delta x + V_\perp \overline{\beta}_\perp - \sqrt{n}v_{||}\overline{\tau} + v_\phi$$

Attitude Lever Arm

In practice, the INS is not collocated with the GPS antenna on the vehicle. The lever arm, d, from the inertial to the GPS antenna defines the vector displacement between the INS error, r, and the GPS antenna offset, δx as a function of the (3×3) attitude matrix, A, as follows $$\delta x = r + A^T d$$

It is possible to linearize this equation about a nominal attitude $A_0$ for a vector of small attitude perturbations $\Psi$.

$$\delta x = r + A^T d$$
$$= r + A_0^T(I - \Psi^x)d$$
$$= r + A_0^T d + A_0^T D^x \Psi$$

where the cross notation $$\Psi^x = \begin{pmatrix} 0 & -\psi_3 & \psi_2 \\ \psi_3 & 0 & -\psi_1 \\ -\psi_2 & \psi_1 & 0 \end{pmatrix} \text{ where } \Psi = \begin{bmatrix} \psi_1 \\ \psi_2 \\ \psi_3 \end{bmatrix}$$

indicates a cross product (or pre-multiplication by a vector's skew symmetric matrix).

The resulting observation equation becomes:

$$\phi(t) = \Delta\phi|_{x_0} - S^T(r + A_0^T d + A_0^T D^x \Psi) + V_\perp \bar{\beta}_\perp - \sqrt{n} v_\parallel \bar{\tau} + v_\phi$$

$$\phi(t) = (\Delta\phi|_{x_0} - S^T A_0^T d) - S^T r - S^T A_0^T D^x \Psi + V_\perp \bar{\beta}_\perp - \sqrt{n} v_\parallel \bar{\tau} + v_\phi$$

Inertial Navigation System Model

The characteristics of the inertial system can be evaluated by analyzing a linearized representation of the INS vector error equations of motion (see, e.g., I. Y. Bar-Itzhack and N. Berman, "Control Theoretic Approach to Inertial Navigation Systems," AIAA Paper 87-2591, 1987):

$$\dot{r} + \rho \times r = v$$

$$\dot{v} + (\Omega + \omega) \times v = \nabla - \psi \times f + \Delta g$$

$$\dot{\psi} + \omega \times \psi = \epsilon$$

where the Cartesian vector r is the INS position error, v is the velocity error, $\rho$ is the user frame rate with respect to the North, East, Down coordinate system, $\Omega$ is the Earth rotation rate, $\omega = \Omega + \rho$, $\nabla$ is the accelerometer error, $\Psi$ is the attitude error, f is the specific force, $\Delta g$ is the gravity error; and $\epsilon$ is the gyro rate error.

This set of equations has a state space representation as a 9×9 set of linear equations as follows:

$$\dot{x} = Fx + Gu + w$$

where x is the state vector and w is a vector of random noise error. For the Inertial Processor, the control variable u corresponds to the pre-processed strapdown accelerometer and rate gyro measurements. In practice, for the error equation, these control inputs precisely cancel and are therefore assumed to be identically zero. We add 6 additional states for gyro and accelerometer biases in the three spatial dimensions each to illustrate how these key parameters can be estimated in real time in the invention.

Next, the inertial system dynamics is linearized and represented in state space form as in the following 15×15 system of equations:

$$\frac{d}{dt}\begin{bmatrix} r \\ v \\ \psi \\ b_a \\ b_g \end{bmatrix} = \begin{bmatrix} & I & & & \\ G_{vr} & \Omega_{vv} & G_{v\psi} & I & \\ & & \Omega_{\psi\psi} & & I \\ & & & -\tau_a^{-1} I & \\ & & & & -\tau_g^{-1} I \end{bmatrix} \begin{bmatrix} r \\ v \\ \psi \\ b_a \\ b_g \end{bmatrix} + \begin{bmatrix} 0 \\ w_{VRW} \\ w_{ARW} \\ w_a \\ w_g \end{bmatrix}$$

where:

$$G_{vr} = -\frac{g}{R}\begin{bmatrix} 1 & 0 & 0 \\ 0 & 1 & 0 \\ 0 & 0 & -2 \end{bmatrix}$$

$$\Omega_{vv} = -\begin{bmatrix} 0 & 2\Omega_D & 0 \\ -2\Omega_D & 0 & 2\Omega_N \\ 0 & -2\Omega_N & 0 \end{bmatrix}$$

$$G_{v\psi} = \begin{bmatrix} 0 & g & 0 \\ -g & 0 & 0 \\ 0 & 0 & 0 \end{bmatrix}$$

$$\Omega_{\psi\psi} = -\begin{bmatrix} 0 & \Omega_D & 0 \\ -\Omega_D & 0 & \Omega_N \\ 0 & -\Omega_N & 0 \end{bmatrix}$$

where g is the local acceleration due to gravity, R is the radius of the Earth, and $\Omega_N$ and $\Omega_D$ are the components of the Earth rotation vector projected into the North and Down directions, respectively.

Correlator Model

Given the rapid clock updates from the LEO satellites that occur over the GPS pre-detection interval and to accurately model the effects of inertial noise over the extended interval, it is also preferable to carry a model of the receiver correlator. This integrated model will also be used to command the receiver NCO as a built-in state variable. Our objective will be to conform to the standard measurement update equations as follows:

$$y_k = Hx_k + v_k$$

$$\hat{x}_k = \bar{x}_k + L(y_k - H\bar{x}_k) = \bar{x}_k + L(y_k - \bar{y}_k) = \bar{x}_k + L\Delta y_k$$

such that the observable $\Delta y_k$ is the correlator output integrated over the pre-detection interval.

The correlator is modeled as coherently integrating over time T the in-phase and quadrature component of an input whose signal amplitude is $\sqrt{2C}$, phase $\phi(t)$, and in-phase and quadrature noise n(t). Assuming that the tracking error remains small over the pre-detection interval, the correlator model reduces to a simple phase error integral subject to an equivalent angular noise, v.

$$\delta\varphi_k = y_k - \bar{y}_k = L\int_{(k-1)T}^{kT} \left[\sqrt{2C}\ e^{j\varphi(t)} + n(t)\right] e^{-j\bar{\varphi}(t)} dt \approx$$

$$\frac{1}{T}\int_{(k-1)T}^{kT} [\varphi(t) - \bar{\varphi}(t) + v] dt$$

$$y_k = \frac{1}{T}\int_{(k-1)T}^{kT} [\varphi(t) + v] dt = \frac{1}{T}\int_{(k-1)T}^{kT} \varphi(t) dt + v_k$$

$$\bar{y}_k = \frac{1}{T}\int_{(k-1)T}^{kT} \bar{\varphi}(t) dt$$

-continued $$\dot{\overline{y}}_k = \frac{1}{T}\overline{\varphi}(t)$$

A new continuous observable $\overline{y}$ is temporarily defined that can be carried as a separate state variable to ultimately construct the discrete estimated observable $\overline{y}_k$. The 1/T scale factor in the definition of the continuous observable serves as a placeholder and reminder that when the continuous system is converted to discrete form, that the correlator output is the integral over the interval T. The instantaneous a priori phase for feed forward to a given channel is given by $$\overline{\varphi}(t) = \begin{bmatrix} \overline{\varphi}(t) \\ \vdots \\ \overline{\varphi}_2(t) \\ \overline{\varphi}_1(t) \end{bmatrix} =$$

$$\begin{bmatrix} \|\overline{x}_0(t) - x_{satellite}^{(n)}(t)\|_2 + [\varphi_{reference}^{(n)}(t) - \rho_{reference}^{(n)}(t)] + \rho_i^{(n)} - \rho_i^{(n)} \\ \vdots \\ \|\overline{x}_0(t) - x_{satellite}^{(2)}(t)\|_2 + [\varphi_{reference}^{(2)}(t) - \rho_{reference}^{(2)}(t)] + \rho_i^{(2)} - \rho_i^{(2)} \\ \|\overline{x}_0(t) - x_{satellite}^{(1)}(t)\|_2 + [\varphi_{reference}^{(1)}(t) - \rho_{reference}^{(1)}(t)] + \rho_i^{(1)} - \rho_i^{(1)} \end{bmatrix} -$$

$$S^T \overline{A}_0^T b - S^T \overline{r} - S^T \overline{A}_0^T B^x \overline{\Psi} + V_\perp \overline{\beta}_\perp - \begin{bmatrix} 1 \\ \vdots \\ 1 \\ 1 \end{bmatrix} \overline{\tau}$$

Because the state variables are now considered to be estimator states, the bar notation has been applied. The complete correlator model is formed by stacking the feed forward received signal phase for each satellite.

$$\dot{\overline{y}} = \frac{1}{T}\overline{\varphi}(t) = \frac{1}{T}[(\Delta\varphi|_{\overline{x}_0} - S^T \overline{A}_0^T b) - S^T \overline{r} - S^T \overline{A}_0^T B^x \overline{\Psi} + V_\perp \overline{\beta}_\perp - \sqrt{n} \, v_\| \overline{\tau}]$$

One aspect of the invention involves proper modeling of the correlator. While the inertial, GPS/LEO tracking loops, and receiver clocks ordinarily operate independently, the subsystems are interconnected to an exceptionally tight centimeter-level tolerance at the correlator. The correlator provides the primary mechanism for state feedback. Because each subsystem may operate at a different update rate, each input is preferably accounted for in the correlator model to take full advantage of accurate state feedback.

Integrated System

It is now possible to combine the all-in-view correlator, inertial, tracking bias, and clock state equations into a single integrated system as follows $$\frac{d}{dt}\begin{bmatrix} \overline{y} \\ \overline{r} \\ \overline{v} \\ \overline{\Psi} \\ \overline{b}_a \\ \overline{b}_g \\ \overline{\beta}_1 \\ \dot{\overline{\beta}}_\perp \\ \overline{\tau} \\ \dot{\overline{\tau}} \end{bmatrix} = \begin{bmatrix} 0 & -S^T & -S^T A_0^T B^x & & V_- & 0 & -1 & 0 \\ & & I & & & & & \\ & G_{vr} & \Omega_{vv} & G_{v\psi} & I & & & \\ & & & \Omega_{\psi\psi} & & I & & \\ & & & & -\tau_a^{-1} I & & & \\ & & & & & -\tau_g^{-1} I & & \\ & & & & & & 0 & I \\ & & & & & & 0 & -\tau_\beta^{-1} \\ & & & & & & & & 0 & 1 \\ & & & & & & & & 0 & -\tau_\tau^{-1} \end{bmatrix} \begin{bmatrix} \overline{y} \\ \overline{r} \\ \overline{v} \\ \overline{\Psi} \\ \overline{b}_a \\ \overline{b}_g \\ \overline{\beta}_1 \\ \dot{\overline{\beta}}_\perp \\ \overline{\tau} \\ \dot{\overline{\tau}} \end{bmatrix} + \begin{bmatrix} \Delta\varphi|_{\overline{x}_0} - S^T \overline{A}_0^T b \\ 0 \\ 0 \\ 0 \\ 0 \\ 0 \\ 0 \\ 0 \\ 0 \\ 0 \end{bmatrix} + \begin{bmatrix} 0 \\ 0 \\ w_{VRW} \\ w_{ARW} \\ w_a \\ w_g \\ 0 \\ w_\beta \\ w_\tau \\ w_t \end{bmatrix}$$

The continuous system $\dot{x} = Fx + w$ is converted to discrete form as follows using well-known state space methodology. See, e.g., Gene F. Franklin, J. David Powell, Michael L. Workman, *Digital Control of Dynamic Systems*, Second Edition, Addison-Wesley, New York, 1990:

$$x_{k+1} = \Phi x_k + w_k$$

$$\Phi = e^{FT}$$

The discrete system is then augmented with a discrete state $\overline{y}_0$ to represent the value of the continuous state vector $\overline{y}$ at the end of the previous time step (k−1). The state $\overline{y}_1$ represents the continuous value of $\overline{y}$ at the end of the current time step (k). This development completes the model of the integrate-and-dump correlators so that the implementation only outputs the exact integral value taken over a single time step, T, consistent with the original correlator definition above. The discrete state transition equation is then repartitioned as follows:

$$\begin{bmatrix} \overline{y}_0 \\ \overline{y}_1 \\ x' \end{bmatrix}_{k+1} = \begin{bmatrix} 0 & I & 0 \\ 0 & \Phi_{yy} & \Phi_{yx'} \\ 0 & \Phi_{x'y} & \Phi_{x'x'} \end{bmatrix} \begin{bmatrix} \overline{y}_0 \\ \overline{y}_1 \\ x' \end{bmatrix}_k + w_k$$

where $$\overline{y}_k = H\overline{x}_k = (\overline{y}_1 - \overline{y}_0)_k = [-I \mid I \mid 0] \begin{bmatrix} \overline{y}_0 \\ \overline{y}_1 \\ x' \end{bmatrix}_k$$

-continued $$\Phi = \begin{bmatrix} \Phi_{yy} & \Phi_{yx'} \\ \Phi_{x'y} & \Phi_{x'x'} \end{bmatrix}$$

where the variable x' is defined as the original discrete system state vector without including the current correlator states $\bar{y}_0$ and $\bar{y}_1$ shown explicitly above it.

The actual correlator output is modeled by stacking the integrated phase for each satellite in track as follows:

$$y_k = \begin{bmatrix} y^{(n)} \\ y^{(n-1)} \\ \vdots \\ y^{(1)} \end{bmatrix} = \frac{1}{T} \begin{bmatrix} \int_{(k-1)T}^{kT} \varphi^{(n)}(t)dt \\ \int_{(k-1)T}^{kT} \varphi^{(n-1)}(t)dt \\ \vdots \\ \int_{(k-1)T}^{kT} \varphi^{(1)}(t)dt \end{bmatrix} + v_k$$

Because of a previous approximation, this representation is not valid on a stand-alone basis unless and until it is combined with the feed forward component of the correlator output. The total complete correlator output is then given by:

$$\Delta y_k = y_k - \bar{y}_k$$

Using this discrete model, it is now possible to apply a Kalman Filter. The above representation is shown linearized about a particular position and attitude. Because the inertial and ranging equations are non-linear in practice, it is required that the actual implementation be an Extended Kalman Filter (108 in FIG. 1). Solving for the exact biases using this discrete model captures slow component drifts during the PDI and permits the error model to be exact. Depending on the ambient jamming for each satellite, the diagonals of the GPS carrier phase measurements, $R_v$, will lie in the neighborhood of about $(0.5\text{ cm})^2$ in steady state. The error growth may be determined by integrating the power spectral density, $R_{wpsd}$, of the white process noise driving the system:

$$\bar{x}_{k+1} = \Phi \hat{x}_k$$

$$M_{k+1} = \Phi(T)P_k\Phi^T(T) + \int_0^T \Phi(\tau)R_{wpsd}\Phi^T(\tau)d\tau$$

where P is the a posteriori state covariance matrix, and M is the a priori state covariance matrix. During operations the preferred embodiment uses a full Extended Kalman Filter to dynamically adjust for initial conditions, specific non-linear geometries, and time varying J/S ratios. The measurement update is then given by $$\hat{x}_k = \bar{x}_k + P_k H^T R_v^{-1} \Delta y$$

$$P_k = M_k - M_k H^T (H M_k H^T + R_v)^{-1} H M_k$$

For analysis purposes, it is appropriate to use an optimal estimator and choose the observation gains such that P will become the steady state post-measurement covariance and M is the steady-state, pre-measurement covariance. An optimal steady-state gain, L, may be calculated by solving the well-known algebraic Riccatti equation. The eigenvalues, $\lambda$, of the complete closed loop system may then be calculated such that $$(\Phi - \Phi LH)x = \lambda x$$

The discussion so far has laid down the basic concept of the anti-jam system operation. However, we have implemented the preferred embodiment to make the system practical for use in extremely demanding situations. In the preferred embodiment, single differences are employed to track each ranging source rather than double differences. This more general form best handles dynamic environments with a minimum number of channel tracking resources while multiple LEO satellites are being tracked and satellites are transitioning in and out of view.

If the requisite geometry is present, resulting especially from LEO large angle motion, this receiver will also solve for the state biases to reveal an accurate three-dimensional position fix using only the carrier phase from the GPS and LEO satellites. This capability extends not only under jamming but also under normal signal conditions where the user platform dynamics are too severe for an ordinary GPS receiver to track. The tracking state biases should be given a time constant on the order of a minute or two.

The Extended Kalman Filter is subdivided into four components: a form of continuous time update that provides the carrier phase feed forward to all the correlators of the receiver and three multi-rate time/measurement updates. The three multi-rate intervals correspond to the INS, LEO, and GPS satellite scales of process and measurement noise. These intervals are tuned for the particular dynamic and jamming circumstances.

Figure 15:
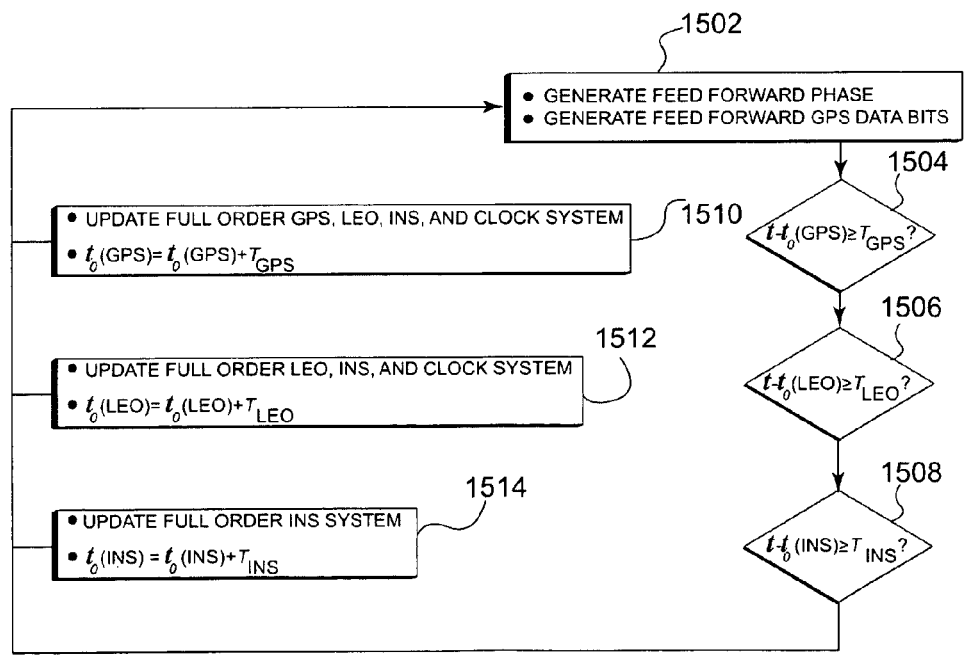
FIG. 15 is a flow-chart depicting an exemplary update process.

FIG. 15 shows a flow chart of the sequence of operations for the Extended Kalman Filter 108. In block 1502, the feed forward phase and feed forward GPS data bits are generated. A reduced order version of the continuous system is used to generate the carrier phase feed forward as follows:

$$\bar{x}(t) = \Phi(t-t_k)\bar{x}_k = e^{F(t-t_k)}\bar{x}_k \approx [I+F(t-t_k)]\bar{x}_k$$

The subsequent INS, LEO, and GPS updates (1510, 1512, and 1514) are also shown in the flow chart. Generally, the fastest interval is $T_{INS}$ which is sufficiently fast to capture the dynamics of the user platform (1508). The next slowest interval is $T_{LEO}$ (1506) which is generally set on par with the LEO data rate. The slowest interval is $T_{GPS}$ (1504) which is dynamically set based on the instantaneous detected J/S ratio. While the exact value should be determined optimally using the Kalman Filter considering the particular implementation, $T_{GPS}$ will lie in the neighborhood of $$T_{GPS} = 10^{(J/S-70 \, dB)/10 \, dB} \cdot \text{sec}$$

Figure 16:
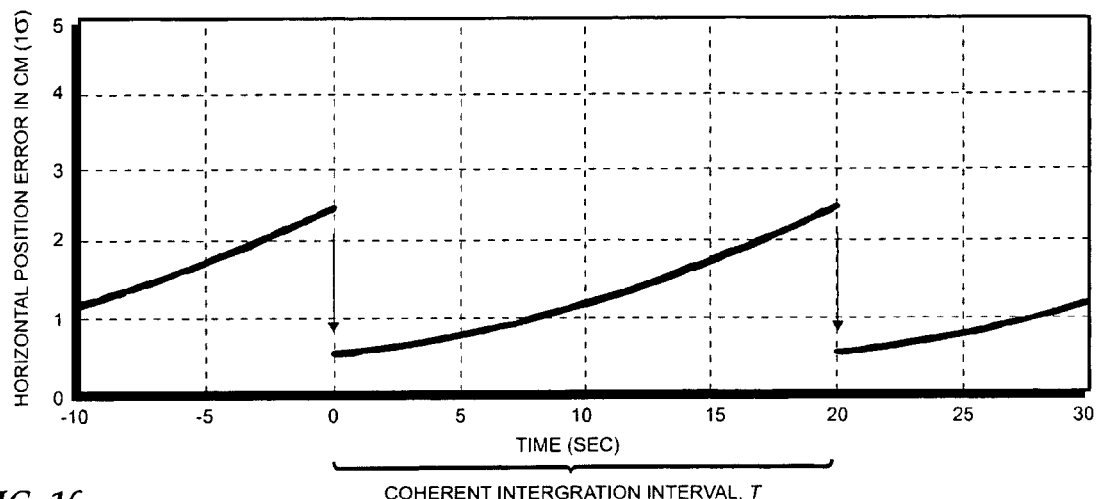
FIG. 16 is a graphical depiction of an exemplary error cycle.

The resulting error growth cycle is shown in FIG. 16 for the case where $T_{GPS}$ is 20 seconds. At each complete system update, the a posteriori position knowledge is reduced according to the new information available from the correlator output measurements. In the interim, the system process noise—dominated by gyro angle random walk—causes the error uncertainty to grow. The Kalman gains and processing intervals are selected so as to keep the inertial error to within a small fraction of a wavelength.

The basic initialization of the system may be carried out in a straightforward way not unlike the well-known operation of a conventional GPS receiver. A two-dimensional search space of code and Doppler combinations is swept out to find the satellite signals. A receiver can aquire under non-jamming conditions and continue on when jamming occurs. The receiver can also acquire under conditions of jamming, whereupon the initial search will take proportionally longer than under unjammed conditions.

The antijam system is not limited to operation with inertial systems. It can also work on a low-dynamic or static implementation. The complete system for the low dynamic case appears as follows:

$$\frac{d}{dt}\begin{bmatrix}\overline{y}\\\overline{r}\\\overline{v}\\\overline{\beta}_\perp\\\dot{\overline{\beta}}_\perp\\\overline{\tau}\\\dot{\overline{\tau}}\end{bmatrix} = \begin{bmatrix}0 & -S^T & V_\perp & 0 & -1 & 0\\ & 0 & I & & & \\ & 0 & 0 & & & \\ & & & 0 & I & \\ & & & 0 & -\tau_\beta^{-1} & \\ & & & & & 0 & 1\\ & & & & & 0 & -\tau_t^{-1}\end{bmatrix}\begin{bmatrix}\overline{y}\\\overline{r}\\\overline{v}\\\overline{\beta}_\perp\\\dot{\overline{\beta}}_\perp\\\overline{\tau}\\\dot{\overline{\tau}}\end{bmatrix} + \begin{bmatrix}\Delta\varphi|_{x_0}\\0\\0\\0\\0\\0\\0\end{bmatrix} + \begin{bmatrix}0\\0\\w_{acc}\\0\\w_\beta\\w_\tau\\w_\tau\end{bmatrix}$$

The static case is implemented by removing the velocity state.

The integrity of the navigation output is often of critical importance. The navigation system and method described herein is fully compatible with providing the highest possible thresholds of integrity. Upon convergence of the Extended Kalman Filter 108 to steady state—even under jamming conditions—there is a significant amount of redundant information available in the measurement residuals to detect anomalous conditions. The integrity approach uses a variant of the well-known Receiver Autonomous Integrity Monitoring (RAIM). It is assumed that most state variables have converged to centimeter-level accuracy and that updates to the inertial bias states—especially position error—are occurring to centimeter-level accuracy. Therefore, it is possible to construct a RAIM residual as follows:

$$R_k = \|y_k - H\hat{x}_k\|_2 = \|(I + HP_k H^T R_v^{-1})\Delta y_k\|_2$$

which forms a chi-square distribution with effectively n−4 degrees of freedom. Given a sufficient redundancy of satellites, i.e., n>4, a threshold can be applied to the residual to test failure hypotheses. Given further redundancy, i.e., n>5, and anti-jam margin, more elaborate RAIM implementations are capable of fault detection and exclusion.

Figure 17:
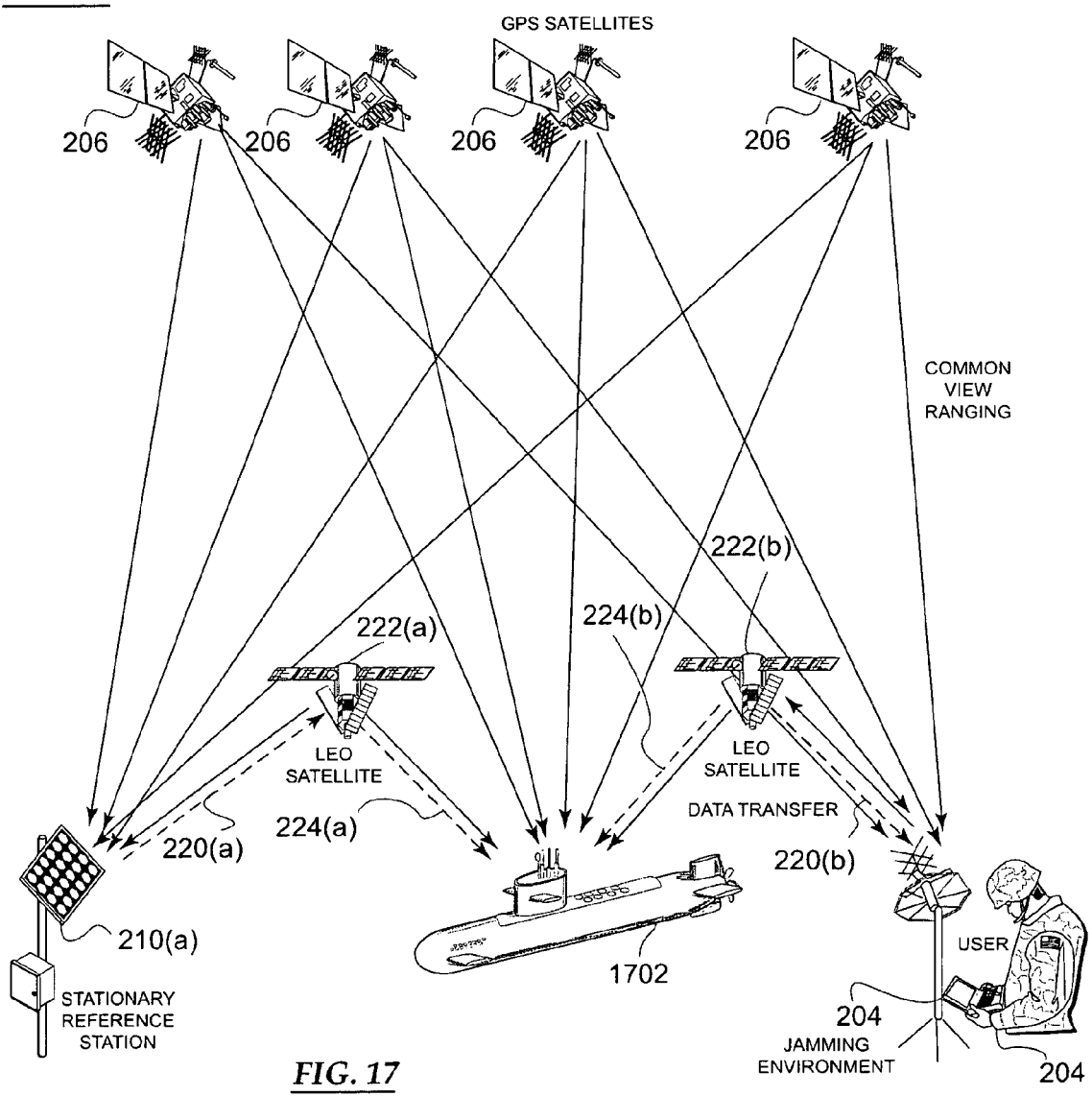
FIG. 17 is a schematic overview of a navigation system with a moving reference.

As mentioned previously, networks of ground monitor stations and traditional GPS time transfer may be employed to ensure that any given LEO satellite 222 to be used has access to $\tau_{ref}$. If these ground monitor stations are not available, there are additional alternatives that can be employed. The first is a moving ground reference station 1702 as shown in FIG. 17. If precise relative position of reference station 1702 is available from kinematic GPS, then the precise reference clock $\tau_{mobile}$ required to serve as the base station for this invention may be solved in a least squares sense from the phase measurements from both the stationary and mobile platforms as follows:

$$\left\| [-S^T - 1]\begin{bmatrix}\delta x\\ \tau_{mobile} - \tau_{stationary}\end{bmatrix} - \delta\varphi\bigg|_{mobile^{(t)}} \right\|_2$$

Figure 18:
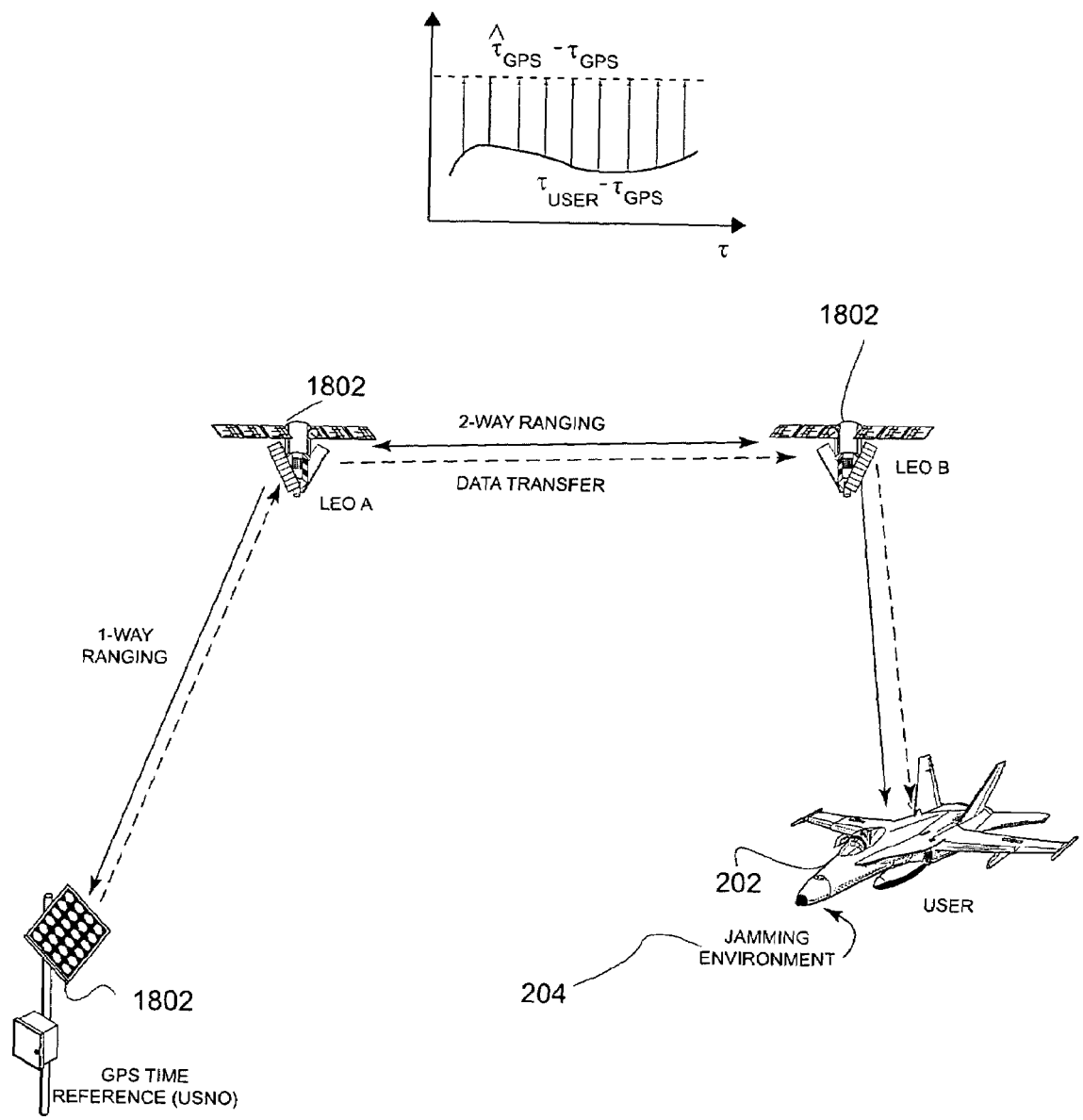
FIG. 18 is a schematic overview of a system illustrating LEO cross-links.

Another means of transferring network time across distances larger than the LEO footprint is to use crosslinks as shown in FIG. 18. In this embodiment, two-way coherent ranging is carried out between adjacent spacecraft 1802 and 1804. Since each LEO spacecraft operates using a coherent clock, the error contribution of each spacecraft clock cancels precisely. Therefore, with precise knowledge of each vehicle position, it is possible to reconstruct the reference time of the master ground station 1802.

Invoking the identical development for the preferred embodiment using common view, $$\Delta\varphi = [\varphi_{user}^{LEO(1)} - \rho_{user}^{LEO(1)}] + \frac{1}{2}\{[\varphi_{LEO|2|}^{LEO(1)} - \rho_{LEO|2|}^{LEO(1)}] -$$
$$[\varphi_{LEO|1|}^{LEO(2)} - \rho_{LEO|2|}^{LEO(1)}]\} - [\varphi_{reference}^{LEO(2)} - \rho_{reference}^{LEO(2)}]$$
$$= b + \tau_{reference} - \tau_{user} - + \rho_i - \rho_i + v$$

The spacecraft clocks cancel precisely. In the preferred embodiment, two-way crosslinks have been employed to achieve a result whose noise contribution is a factor of $1/\sqrt{2}$ smaller than one way.

This result may then be carried forward to achieve an identical result as the common view development, namely, $$\dot{\overline{y}} = \frac{1}{T}\overline{\varphi}(t) = \frac{1}{T}[(\Delta\varphi|_{\overline{x}_0} - S^T\overline{A}_0^T b) - S^T\overline{r} - S^T\overline{A}_0^T B \times \overline{\Psi} + V_\perp\overline{\beta}_\perp$$
$$- \sqrt{n}\,v_\parallel\overline{\tau}]$$

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A navigation system comprising:
   a reference receiver;
   a user receiver;
   a global positioning system (GPS) satellite in common view of said reference receiver and said user receiver, wherein said reference receiver and said user receiver receive a carrier ranging signal from said GPS satellite;
   a first low earth orbit (LEO) satellite in common view of said reference receiver and said user receiver, wherein said reference receiver and said user receiver are configured to calculate respective first and second measurements of an LEO carrier ranging signal received from said first LEO satellite;

said user receiver configured to receive, via said LEO satellite, said first measurement from said reference receiver and apply said first and second measurements to construct an a priori estimate of a signal phase of said GPS carrier ranging signal received by said user receiver, wherein said a priori estimate is used as the basis of an extended integration of said carrier ranging signal at said user receiver.

2. A navigation system according to claim 1, further comprising a plurality of LEO satellites, wherein one or more of said plurality of LEO satellites contributes to said a priori estimate.

3. A navigation system according to claim 1, wherein said user receiver employs ephemeris information to determine said a priori estimate, wherein said a priori estimate is a small fraction of wavelength over the extended integration interval.

4. A navigation system according to claim 1, further including a plurality of GPS satellites, wherein a plurality of respective carrier ranging signals from said GPS satellites are combined by said receiver to form a navigation solution.

5. A navigation system according to claim 2, further including a plurality of GPS satellites, wherein a plurality of respective carrier ranging signals from said GPS satellites are combined by said receiver to form a navigation solution.

6. A navigation system according to claim 1, wherein said extended integration is used to recover code phase ranging information embedded in said carrier ranging signal from said GPS satellite.

7. A navigation system according to claim 6, wherein said code phase ranging information from said plurality of GPS satellites is used to calculate a position and a clock offset of said user receiver.

8. A navigation system according to claim 1, wherein said first and second measurements provide said user receiver with a precise relative time estimate between said reference receiver and said user receiver.

9. A navigation system according to claim 7, wherein said code phase ranging information provides said user receiver with a time estimate that is both precise with respect to said reference receiver time, and is accurate with respect to GPS time.

10. A navigation system according to claim 5, wherein a geometry change of said plurality of LEO and GPS satellites is employed by said user receiver to estimate the system biases.

11. A navigation system according to claim 5, further comprising a plurality of LEO satellites, wherein orthogonalization is employed by said user receiver to partition tracking bias state variables associated with said plurality of GPS satellites, said plurality of LEO satellites, and a clock associated with said user receiver.

12. A navigation system according to claim 5, wherein said user receiver is stationary.

13. A navigation system according to claim 7, wherein said user receiver operates under low dynamics.

14. A navigation system of claim 5, wherein an inertial navigation system within said user receiver is employed to subtract out the motion of said user receiver.

15. A navigation system of claim 14, wherein a set of bias corrections generated by said inertial navigation system are sufficient to provide accuracy to less than a small fraction of a wavelength over an interval of said extended integration.

16. A navigation system according to claim 5, wherein said reference station is mobile.

17. A navigation system according to claim 16, wherein said reference station is a second LEO satellite.

18. A navigation system of claim 16, wherein said reference receiver is a component of said first LEO satellite.

19. A navigation method wherein a reference receiver and a user receiver receive a carrier ranging signal from a GPS satellite in common view, comprising the steps of:
measuring, by said reference receiver, a carrier ranging signal from a first LEO satellite in view to produce a first measurement;
measuring, by said user receiver, a carrier ranging signal from a second LEO satellite in view to produce a second measurement;
said first LEO satellite and said second LEO satellite measuring carrier ranging crosslink signals from each other to produce a third and a fourth measurement, respectively;
conveying said first, third, and fourth measurements from said reference receiver and said first and second LEO satellites to said user receiver;
using said first, second, third, and fourth measurements to construct an a priori estimate of a phase of the carrier ranging signal from the GPS satellite; and
using said a priori estimate as the basis of an extended integration of said GPS satellite signal received by said user receiver.

20. The method of claim 19, wherein carrier ranging signals from one or more GPS satellites are combined to form a navigation solution.

21. The method of claim 20, wherein an inertial navigation system is employed to subtract out the motion of said user receiver.

22. The method of claim 21, wherein the bias corrections of said inertial navigation system are sufficient to provide accuracy to less than a small fraction of a wavelength over said extended integration interval.

23. A navigation method wherein a reference receiver and user receiver receive a carrier ranging signal from a GPS satellite in common view, comprising the steps of:
measuring, by said reference receiver and said user receiver, a carrier ranging signal from a first LEO satellite in common view to produce first and second measurements, respectively;
conveying said first measurement to said user receiver,
applying, by said user receiver, said first and second measurements to construct an a priori estimate of a phase of said GPS carrier ranging signal,
using said a priori estimate as the basis of an extended integration of said GPS satellite signal received by said user receiver.

24. The navigation method of claim 23, wherein one or more LEO satellites contribute to said a priori estimate of the incoming GPS signal phase.

25. The navigation method of claim 23, wherein carrier ranging signals from one or more GPS satellites are combined to form a navigation solution.

26. The navigation method of claim 24, wherein the carrier ranging signals from a plurality of GPS satellites are combined to form a navigation solution.

27. The navigation method of claim 23, wherein precise streaming feed forward ephemeris information is used to achieve a priori estimates of carrier phase that are a small fraction of wavelength over the extended integration interval.

28. The navigation method of claim 26, wherein a centralized regulator models and controls one or more correlators, one or more inertial sensors, one or more tracking bias states, and one or more clock states within said user receiver.

29. The navigation method of claim 28, wherein said centralized regulator calculates and conveys precise streaming feed forward carrier phase information to each of said correlators to achieve a priori estimates of incoming carrier phase that are accurate to a small fraction of wavelength over said extended integration interval.

30. The navigation method of claim 29, wherein orthogonalization is employed to partition tracking bias state variables associated with said plurality of GPS satellites, said one or more LEO satellites, and a set of common-mode components, including a user clock.

31. The navigation method of claim 30, wherein said orthogonalization is triangular.

* * * * *